United States Patent [19]

Shen et al.

[11] Patent Number: 5,657,549
[45] Date of Patent: Aug. 19, 1997

[54] METHOD OF IMPROVING ACCURACY OF TOUCH TRIGGER PROBE

[76] Inventors: Yin-Lin Shen, 1297 Browns Mill Ct., Herndon, Va. 22070; James D. Lee, 13010 Esworthy Rd., Gaithersburg, Md. 20878

[21] Appl. No.: 538,952

[22] Filed: Oct. 4, 1995

[51] Int. Cl.$^6$ ................................................ G01B 5/008
[52] U.S. Cl. ................................ 33/503; 33/504; 33/561
[58] Field of Search ..................... 33/503, 504, 561, 33/502, 556, 558, 559; 73/15, 865.8; 364/560

[56] References Cited

U.S. PATENT DOCUMENTS

| | | |
|---|---|---|
| 3,945,124 | 3/1976 | Jacoby et al. |
| 4,078,314 | 3/1978 | McMurtry. |
| 4,136,458 | 1/1979 | Bell et al. |
| 4,138,823 | 2/1979 | McMurtry. |
| 4,153,998 | 5/1979 | McMurtry. |
| 4,155,171 | 5/1979 | McMurtry. |
| 4,158,919 | 6/1979 | McMurtry. |
| 4,270,275 | 6/1981 | McMurtry. |
| 4,279,080 | 7/1981 | Nakaya. |
| 4,333,238 | 6/1982 | McMurtry ........................ 33/503 |
| 4,339,714 | 7/1982 | Ellis. |
| 4,443,946 | 4/1984 | McMurtry. |
| 4,451,988 | 6/1984 | McMurtry. |
| 4,462,162 | 7/1984 | McMurtry. |
| 4,578,873 | 4/1986 | Klingler et al. |

(List continued on next page.)

FOREIGN PATENT DOCUMENTS

| 261815 | 11/1991 | Japan ...................... 33/503 |
|---|---|---|

OTHER PUBLICATIONS

M. Lynch, "How a Touch Probe Works", *Modern Machine Shop*, Oct. 1993, pp. 142, 144.

D. Bobo, "Update of Touch Probe Technology", presented at Jun. 6–7, 1995 *Proceedings of ASME CMMS Application Conference*, pp. 1–14.

H. Kunzmann et al., "Concept for the Traceability of Measurements with Coordinate Measuring Machines", *7th International Precision Engineering Seminar*, Kobe, Japan, May 17–21, 1993, pp. 1–14.

D.H. Genest, "Coordinate Measuring Machines (CMMS)", *Quality in Manufacturing*, 1994, pp. 21–23. No Month.

W. T. Estler et al., "Error Compensation for CMM Touch Trigger Probes", *Proceedings ASPE Annual Meeting*, Oct. 15–20, 1995, vol. 12, pp. 428–431.

J. Bosch, *Coordinate Measuring Machine and Systems*, Jun. 1995, Marcel Dekker Inc., New York, pp. 30–33, 38–53, 62–65, 84–95, 168–179, 196–199, 304–311.

C. Butler, "An investigation into the performance of probes on coordinate measuring machines", *Industrial Metrology*, 2, 1991, pp. 59–70.

G. Herrin, "Touch Probe", *Modern Machine Shop*, 1989, pp. 106, 108. No Month.

T. Jarman et al, "Performance Characteristics of Touch Trigger Probes", *Proceedings of Precision Metrology with Coordinate Measurement Systems*, Jun. 12–14, 1990, SME, Troy, Michigan.

*Primary Examiner*—Thomas B. Will
*Attorney, Agent, or Firm*—Burns, Doane, Swecker & Mathis, L.L.P.

[57] ABSTRACT

A method for improving accuracy of dimensional measurements of a touch trigger probe. The method includes moving a touch trigger probe in an approach direction toward an object, contacting a contact point on the object with a portion of the touch trigger probe, generating a trigger signal corresponding to coordinates of the contact point after the touch trigger probe travels a pretraveled distance, and adjusting the coordinates to compensate for the pretravel. The adjusting step compensates for bending of the touch trigger probe and the bending is calculated as a function of trigger force derived from contact forces of a kinematic seating arrangement of the touch trigger probe. The method is effective in compensating for variations in trigger force due to the approach direction commonly referred to as lobing. The method is applicable to straight and non-straight touch trigger probes.

20 Claims, 15 Drawing Sheets

U.S. PATENT DOCUMENTS

| | | | |
|---|---|---|---|
| 4,694,584 | 9/1987 | Mills | 33/366 |
| 4,780,961 | 11/1988 | Shelton et al. | 33/559 |
| 4,782,598 | 11/1988 | Guarini | 33/503 |
| 4,813,151 | 3/1989 | Hajdukiewicz et al. | |
| 4,817,362 | 4/1989 | Archer. | |
| 4,945,501 | 7/1990 | Bell et al. | 33/503 |
| 5,222,034 | 6/1993 | Shelton et al. | 33/503 |
| 5,228,352 | 7/1993 | McMurtry et al. | 33/561 |
| 5,283,630 | 2/1994 | Yoshizumi | 33/503 |
| 5,425,180 | 6/1995 | Breyer | 33/561 |
| 5,471,406 | 11/1995 | Breyer et al. | 33/503 |
| 5,501,096 | 3/1996 | Stettner et al. | 33/503 |
| 5,526,576 | 6/1996 | Fuchs et al. | 33/556 |

METHOD OF IMPROVING ACCURACY OF TOUCH TRIGGER PROBE

FIELD OF THE INVENTION

The invention relates to improvements in techniques for improving accuracy of measurements made by touch trigger probes.

BACKGROUND OF THE INVENTION

Touch trigger probes are commonly used on coordinate measuring machines (CMMs) and computer-controlled machine tools in modern manufacturing environments. Lobing or pretravel variation in touch trigger probe applications is well-known. However, in commercial applications, effective error correction methods are not available.

Sensors and probes are devices through which coordinate measuring machines (CMMs) and computer numerically controlled (CNC) machine tools collect measurement data in modern manufacturing environments. Hard probes (ball, tapered plug, and edge probes) have been used for more than twenty years. See D. Genest, "Coordinate measuring machines (CMMs)", *Quality in Manufacturing*, 5 (2), 1994, pp. 21–23. The major shortcoming of these probes is that they require a certain amount of feel by machine operator. As such, they may result in inconsistency from one operator to another. A common solution is the touch trigger probe, which is used in manual and automated CMMs.

Touch trigger probes are available with interchangeable probe tips and extensions and the touch trigger probe automatically closes an electronic switch when the probe tip contacts a workpiece. See C. Butler, "An investigation into the performance of probes on coordinate measuring machines", *Industrial Metrology*, 2, 1991, pp. 59–70; T. Jarman et al, "Performance Characteristics of Touch Trigger Probes", *Proceedings of Precision Metrology with Coordinate Measurement Systems*, 1990, SME, Troy, Mich.; and J. Bosch "Evolution of Measurement", in *Coordinate Measuring Machine and Systems*, 1995, Marcel Dekker Inc., New York.

Touch trigger probes have been used on four- and five-axis machine tools. See G. Herrin, "Five axis probing", *Modern Machine Shop*, 65 (8), 1992, pp. 66–68 and, M. Lynch, "How a Touch Probe Works", *Modern Machine Shop*, 66 (10), 1993, pp. 142–144. The probe has become one of the basic building blocks for supporting untended machining in manufacturing cells and systems. They can be used to detect errors in part setup, part fixturing, improper tool use and tool wear, etc.

Touch trigger probes represent a key innovative technology in coordinate metrology in modern manufacturing processes and systems. The vast majority of probes used on CMMs are touch trigger probes. See C. Reid, "Probe Technology - Beyond Accuracy", *Proceedings of Applying Imaging and Sensoring Technology to CMM Applications*, 1993, SME, Nashville, Tenn. Most of these probes employ a kinematic seating mechanism for the probe stylus. However, there are errors associated with touch trigger probe application. Lobing or pretravel variation is a well-known type of probe error associated with touch trigger probe applications. See T. Hopp, "Computational Metrology", *Proceedings of the 1993 International Forum on Dimensional Tolerancing and Metrology*, Detroit, pp. 207–218 and S. Phillips, "Performance Evaluation", in *Coordinate Measuring Machine and Systems*, supra. Pretravel, caused by bending deflection of the stylus shaft, accounts for the majority of touch trigger probe errors. Pretravel errors are highly repeatable but can be adversely influenced by force variations encountered in different probe approach directions. This can lead to measurement errors caused by variations in stylus shaft bending prior to the trigger instant, i.e., when the threshold value is exceeded. Hysteresis and repeatability are other types of probe errors associated with touch trigger probe applications. See ANSI/ASME B89.1.12M-1990, "Methods for Performance Evaluation of Coordinate Measuring Machines", ASME, 1990, New York.

Errors introduced by the probes remain largely uncompensated although there have been attempts to do so. See Butler, supra and Jarman et al., supra. Commonly used methods dealing with probe lobing include probe calibration (probe datuming) and error mapping/vector compensation. Unfortunately, both methods are not effective in reducing probe lobing. Furthermore, advances in machine accuracy and tighter part tolerances make the probe error one of the major error sources in the measurement processes on CMMs and machine tools. See Bosch, supra and Phillips, supra.

The development of touch trigger probes greatly improved the versatility and usefulness of CMMs. See Bosch, supra. Touch trigger probes are also called switching probes or touch probes. Most touch trigger probes employ a kinematic seating arrangement for the stylus. FIG. 1 shows a typical touch trigger probe design. See Reid, supra. The tripod, which also works as the stylus holder, is seated on a kinematic seating arrangement. The tripod can be tilted when a force is applied to the stylus. Each tripod leg is supported by a kinematic seat formed by two cylinders, and the whole tripod is supported by six supporting cylinders. A spring is installed on top of the tripod to provide a spring force to make the tripod sit at the rest position before and after the probe stylus touches the workpiece during the measurement process. The stylus, which is usually made of steel or ceramic, serves as the means to contact the workpiece in the coordinate measurement process. The probe tip is a ruby ball with high-quality sphericity.

In the measurement process the probe is commanded to approach the workpiece at a constant speed (probe approach rate) when the probe is within the probe approach distance. See ANSI/ASME, supra. Before the probe is in touch with the workpiece, the tripod is held in its rest position by the spring force. No trigger signal is generated when the probe tip initially contacts the workpiece. Instead, the probe continues to move and the probing force, between the probe tip and the workpiece, will build up gradually until the force is large enough to tilt the tripod and cause a physical quantity to reach a threshold setting. A trigger signal is generated when the physical quantity exceeds a threshold in the trigger circuit. The trigger signal is used by the CMM or machine tool to latch the position counters or transducers to record the point coordinates at the triggering instant. The distance travelled by the probe from initial workpiece contact to generation of the trigger signal is known as probe pretravel.

The major constituent of probe pretravel is stylus bending. See Jarman et al., supra. One major characteristic of the touch trigger probe is that pretravel distances vary when the probe approaches the workpiece from different directions. See Reid, supra. This is because the magnitude of the trigger force varies when the probe approach direction varies. Pretravel-influencing factors include stylus length and material, spring force setting, and probe configuration, etc. See Butler, supra. Probe stylus length is usually decided by application needs. For example, a long stylus is needed when deep internal features are to be measured. Stylus material determines the deflection extent caused by the applied force. Spring force setting affects the force needed to trigger the switch of the probe. Other factors influencing probe pretravel include the form of the probe tip, the geometry of the stylus, and the cleanliness of probe and part to be inspected. Current practices in compensating probe pretravel include probe calibration and error mapping.

Probe calibration is also called probe qualification or probe datuming. It is done by measuring a number of points on a standard artifact, and the measurement data is used fit the feature of the artifact. High-quality spherical artifacts (reference balls) are typically used in the probe calibration process. Since the diameters of the reference ball and the probe tip (usually a ruby ball) are known, an "effective probe tip diameter" can be calculated by fitting the measurement data to a sphere. Usually the least-squares algorithm is used in the sphere fitting program. The effective probe tip diameter is slightly smaller than its true size because of probe pretravel. The effective probe tip diameter is the foundation for probe pretravel correction in the probe calibration method. It is simple and can be done quickly. However, it is not effective since pretravel distances are assumed to be the same in every probe approach direction.

The error mapping approach is similar to the probe calibration approach in that it takes measurements on a high-quality spherical artifact, but it needs a look-up table and interpolation to compensate for pretravel associated with various approach directions. See Jarman et al., supra. It typically needs many measurements on a spherical artifact to establish a good error map since the compensation effectiveness depends on the quality of the interpolation. This method takes more data-collection time and it needs more computation time and memory space to carry out pretravel prediction through interpolation.

There is a need for a pretravel model which can predict probe pretravel by taking its causes into account. The model should enable the compensation of probe pretravel by using a software correction system implementing the pretravel model.

SUMMARY OF THE INVENTION

The invention provides a method for improving accuracy of dimensional measurements of a touch trigger probe, comprising steps of moving a touch trigger probe in an approach direction toward an object; contacting a contact point on the object with a portion of the touch trigger probe as a result of the moving step; generating a trigger signal corresponding to coordinates of the contact point as a result of the contacting step, the trigger signal being generated after the touch trigger probe travels a pretravel distance subsequent to the contacting step; and adjusting the coordinates to compensate for the pretravel, the adjusting step compensating for bending of the touch trigger probe between the contacting step and the generating step, the bending being calculated as a function of trigger force derived from contact forces of a kinematic seating arrangement of the touch trigger probe, the contact forces being defined by equilibrium equations. The trigger force varies as a function of the probe approach direction for touch trigger probes having a spring-loaded tripod support and a stylus having one end thereof attached to the tripod support and a probe tip at an opposite end thereof. With such an arrangement, the calculating of the trigger force can be based on at least one of stylus length, spring force acting on tripod support, tripod leg length and probe approach direction.

The method can be carried out in various ways. For instance, the moving, contacting, generating and adjusting steps can be carried out by a coordinate measuring machine or a computer numerically-controlled machine tool. The touch trigger probe can include a rectilinear stylus extending from a spring-loaded tripod support having three rectilinear legs joined together at one end thereof and forming angles of 120 degrees therebetween, the bending being due to deflection of the stylus wherein the deflection is near a minimum when the approach direction is parallel to a tripod leg having a free end extending away from the contact point and in the approach direction and at a maximum when the approach direction is equidistant between a pair of the tripod legs having free ends extending away from the contact point and in the approach direction. The trigger signal can be generated after a time delay between when the touch trigger probe contacts the object and when a threshold resistance value is reached, the time delay being dependent on an amount of bending of the touch trigger probe and the amount of bending being dependent on the approach direction. The touch trigger probe can include a straight, non-straight, vertically oriented or non-vertically oriented stylus.

The moving, contacting, generating and adjusting steps can be performed as part of a machine setup or part dimension and tolerance measurements. The trigger signal can be generated when a resistance value of an electrical circuit exceeds a threshold value, the coordinates being measured as measurement data by position counters or transducers, the measurement data being processed by data analysis software to provide measurement results. The moving step can be carried out by moving the touch trigger probe at a speed less than 20 mm/sec. The approach direction is dependent on a polar angle and an azimuthal angle of the contact point relative to a machine coordinate system cooperating with the touch trigger probe. If the touch trigger probe includes a non-vertically oriented stylus, the adjusting step can take into account effects of weight and center of gravity of the stylus.

The adjusting step preferably takes into account six contact forces acting on a tripod seating arrangement of the touch trigger probe and a probing force acting on a stylus of the touch trigger probe. The adjusting step can correct variations in pretravel of up to 50 microns with the adjusting step providing an accuracy of less than ±5 microns. Also, the adjusting step can correct variations in pretravel of up to 20 microns with the adjusting step providing an accuracy of less than ±2 microns.

According to other aspects of the invention, the adjusting step can take into account six contact forces acting on a tripod seating arrangement of the touch trigger probe. For instance, the six contact forces can be summed in the adjusting step to derive the trigger force. Alternatively, the trigger force can be derived as a function of the sum of the inverse of each contact force. Also, the adjusting step can take into account six contact areas of the tripod seating arrangement wherein the contact areas are a function of the contact forces and the trigger force is derived as a function of the contact areas.

DETAILED DESCRIPTION OF THE INVENTION

The invention provides a method for correcting pretravel errors in touch trigger probe applications on CMMs and machine tools. The invention derives the probing force at the trigger instant on the basis of a triggering force model which takes into account probe approach direction, trigger force, spring force setting, probe geometry and/or probe stylus material.

The pretravel model according to the invention was used to predict probe pretravel errors associated with a commonly used touch trigger probe in CMM applications. It was shown that the model according to the invention can effectively predict probe pretravel in various probe approach directions. In applying the model in predicting probe pretravel, only one model parameter, the effective stylus shaft radius (r_eff) which is affected by process parameters such as probe speed, trigger condition and moment inertia, needs to be calculated from the probe calibration data. Furthermore, it was shown that no more than 25 points of probe data are needed to perform the prediction. Various 24-point data sets were used to fit the model (r_eff) and it was shown that the r_eff values were stable with less than about 1% variation. Such a result was unexpected and constitutes a significant development in the touch trigger probe art. The pretravel model according to the invention can be used to reduce probe pretravel error in commercial applications. The pretravel model can be implemented by means of a software correction program and the program can be incorporated into conventional machine systems.

There is a need in the touch trigger probe art for a pretravel model which can predict probe pretravel by taking its causes into account. The model should enable the compensation of probe pretravel by using a software correction system implementing the pretravel model. The pretravel model according to the invention uses a trigger force model and a cantilever beam assumption (treating the stylus as a cantilever beam) to predict probe stylus bending deflection at the trigger instant. Only one model parameter, the effective stylus shaft radius, needs to be calculated by using the probe calibration data. Probing data associated with a Renishaw TP2-5 way 3D probe with a 50 mm stylus extension was used to show the prediction effectiveness of the model. Experimental data associated with 1561 probe approach directions were used to test the model. It was shown that by using 24 points of probe calibration data, the model can predict effectively the probe pretravel associated with various probe approach directions. In addition, the values of the calculated model parameter, the effective stylus radius (r_eff), were very stable when various 24-point probe data sets containing noise were used.

Figure 1:
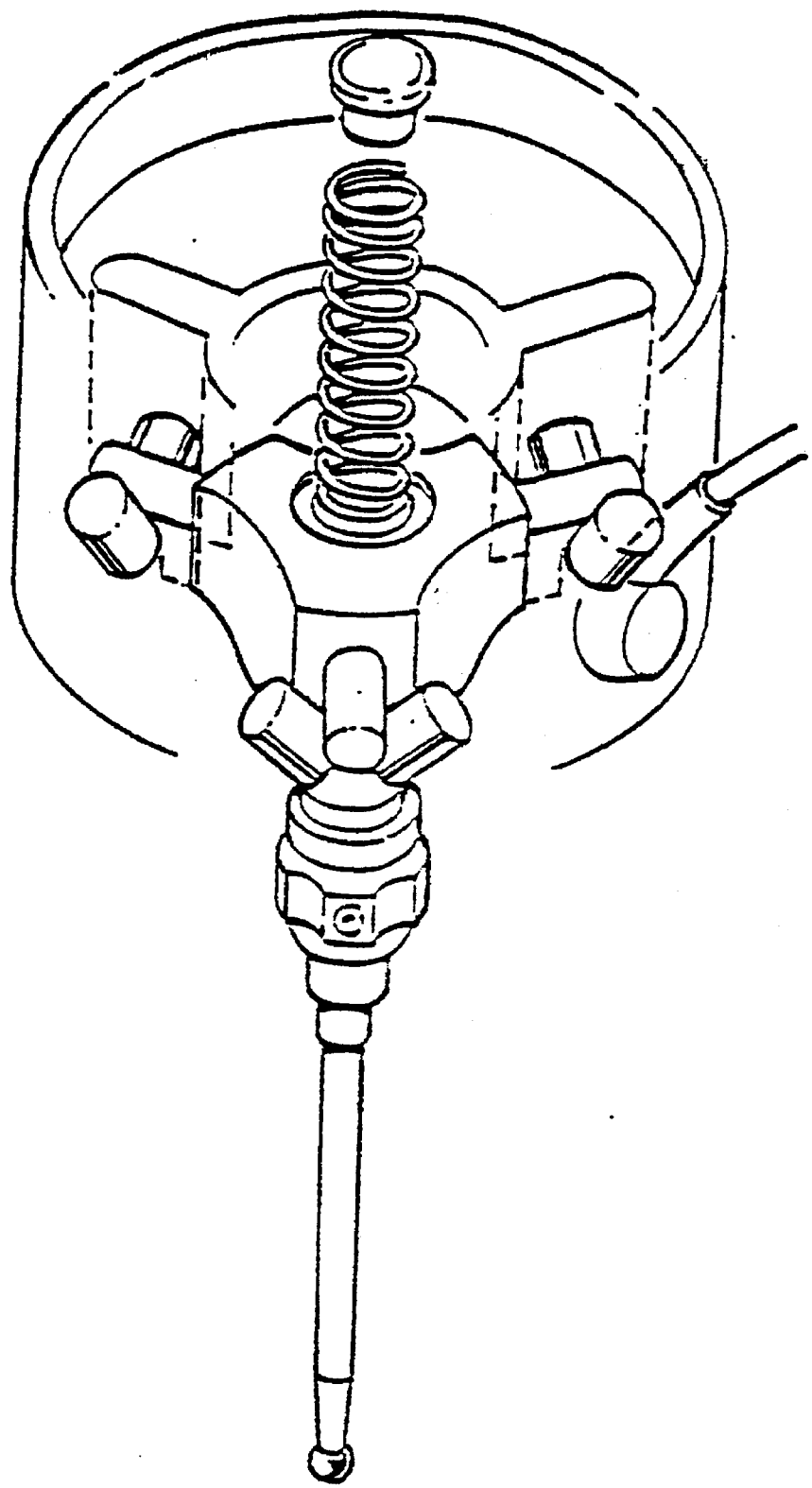
FIG. 1 shows a conventional touch trigger probe design.
Figure 2:
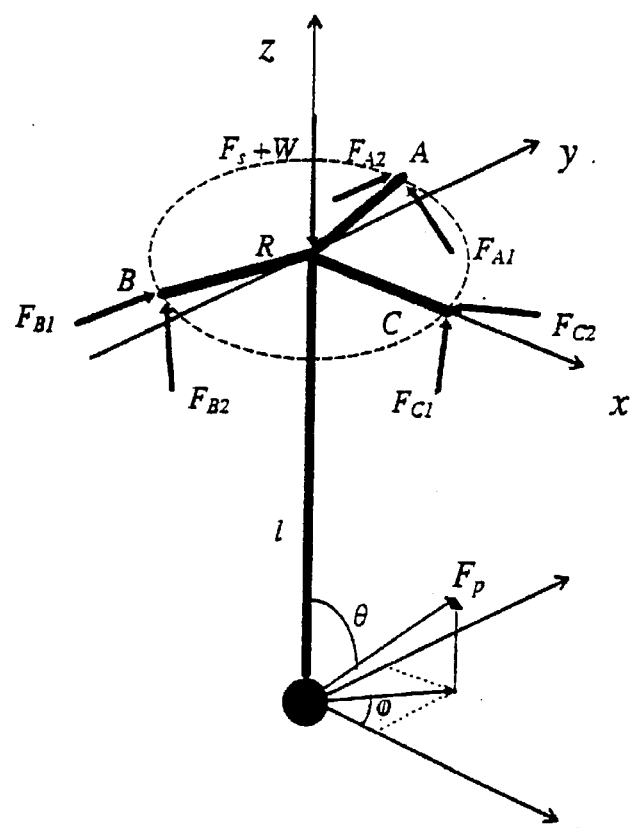
FIG. 2 shows a free body diagram of a tripod-stylus structure in a vertically-oriented tough trigger probe.
Figure 3:
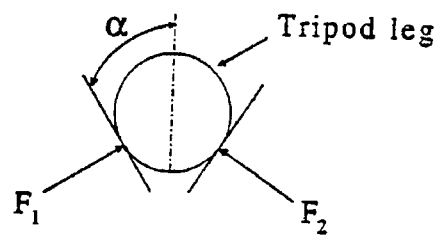
FIG. 3 illustrates a kinematic support angle α used to describe the contact force direction.

The free body diagram of the tripod-stylus structure in a vertically-oriented touch trigger probe is shown in FIG. 2. The spring force, $F_s$, and the weight of the tripod-stylus structure, W, act downward (–Z direction) to hold the tripod in its rest position after the tripod is tilted in measurement processes. There are six contact forces ($F_{A1}$, $F_{A2}$, $F_{B1}$, $F_{B2}$, $F_{C1}$, and $F_{C2}$) at the six contact locations between the tripod and the kinematic seating arrangement. Each tripod leg (A, B, or C) is supported by two contact forces. The directions of the six contact forces can be obtained by analyzing the orientations of the tripod legs and the supporting cylinders. Friction is assumed to be small and negligible. A kinematic support angle, $\alpha$, is used to describe the contact force direction as shown in FIG. 3. The probing force, $F_p$, is the force between the probe tip (the stylus ball) and the workpiece. Before the probe is in touch with the workpiece, $F_p$ equals zero. When the probe tip is in contact with the workpiece but before the trigger signal is generated, $F_p$ has a magnitude greater than zero. The direction of $F_p$ is opposite to the probe approach direction and can be described by two angles: $\theta$ (polar angel) and $\phi$ (azimuthal angle) as shown in FIG. 2. Using the coordinate axes defined in FIG. 2, the following equilibrium equations are obtained wherein F denotes force and M denotes moment:

$$\Sigma F_x = 0 \Rightarrow (-F_{A1} + F_{A2} + F_{B1} - F_{B2})\cos\alpha \cos30° + F_p \sin\theta \cos\phi = 0 \quad (1)$$

$$\Sigma F_y = 0 \Rightarrow (-F_{A1} + F_{A2} - F_{B1} + F_{B2})\cos\alpha \sin30° + (F_{C1} - F_{C2})\cos\alpha + F_p \sin\theta \sin\phi = 0 \quad (2)$$

$$\Sigma F_z = 0 \Rightarrow (F_{A1} + F_{A2} + F_{B1} + F_{B2} + F_{C1} + F_{C2})\sin\alpha + F_p \cos\theta - (F_s + W) = 0 \quad (3)$$

$$\Sigma M_x = 0 \Rightarrow (F_{A1} + F_{A2})R\sin\alpha \cos30° - (F_{B1} + F_{B2})R\sin\alpha \cos30° + F_p l \sin\theta \sin\phi = 0 \quad (4)$$

-continued $$\Sigma M_y = 0 \Rightarrow [(F_{A1} + F_{A2} + F_{B1} + F_{B2})\sin 30° - (F_{C1} + F_{C2})]R\sin\alpha - F_p l \sin\theta \cos\phi = 0 \quad (5)$$

$$\Sigma M_z = 0 \Rightarrow (F_{A1} - F_{A2} + F_{B1} - F_{B2} + F_{C1} - F_{C2})R\cos\alpha = 0 \quad (6)$$

Solving equations (1) through (6), the six contact forces can be expressed as functions of spring force $F_s$, weight of the tripod-stylus structure W, probing force $F_p$, tripod leg length R, stylus extension length l, kinematic support angle $\alpha$, polar angle $\theta$, and azimuthal angle $\phi$.

$$F_{A1} = \frac{F_s + W}{6 \sin\alpha} + F_p \left[ \frac{\sin\theta}{6 \sin\alpha} \frac{l}{R} (\cos\phi - \sqrt{3} \sin\phi) - \frac{\cos\theta}{6 \sin\alpha} + \frac{\sin\theta}{6 \cos\alpha} (\sin\phi + \sqrt{3} \cos\phi) \right] \quad (7)$$

$$F_{A2} = \frac{F_s + W}{6 \sin\alpha} + F_p \left[ \frac{\sin\theta}{6 \sin\alpha} \frac{l}{R} (\cos\phi - \sqrt{3} \sin\phi) - \frac{\cos\theta}{6 \sin\alpha} - \frac{\sin\theta}{6 \cos\alpha} (\sin\phi + \sqrt{3} \cos\phi) \right] \quad (8)$$

$$F_{B1} = \frac{F_s + W}{6 \sin\alpha} + F_p \left[ \frac{\sin\theta}{6 \sin\alpha} \frac{l}{R} (\cos\phi + \sqrt{3} \sin\phi) - \frac{\cos\theta}{6 \sin\alpha} + \frac{\sin\theta}{6 \cos\alpha} (\sin\phi - \sqrt{3} \cos\phi) \right] \quad (9)$$

$$F_{B2} = \frac{F_s + W}{6 \sin\alpha} + F_p \left[ \frac{\sin\theta}{6 \sin\alpha} \frac{l}{R} (\cos\phi + \sqrt{3} \sin\phi) - \frac{\cos\theta}{6 \sin\alpha} - \frac{\sin\theta}{6 \cos\alpha} (\sin\phi - \sqrt{3} \cos\phi) \right] \quad (10)$$

$$F_{C1} = \frac{F_s + W}{6 \sin\alpha} - F_p \left[ \frac{1}{6 \sin\alpha} \left( \cos\theta + 2\frac{l}{R} \sin\theta \cos\phi \right) + \frac{\sin\theta \sin\phi}{3 \cos\alpha} \right] \quad (11)$$

$$F_{C2} = \frac{F_s + W}{6 \sin\alpha} - F_p \left[ \frac{1}{6 \sin\alpha} \left( \cos\theta + 2\frac{l}{R} \sin\theta \cos\phi \right) - \frac{\sin\theta \sin\phi}{3 \cos\alpha} \right] \quad (12)$$

Figure 4:
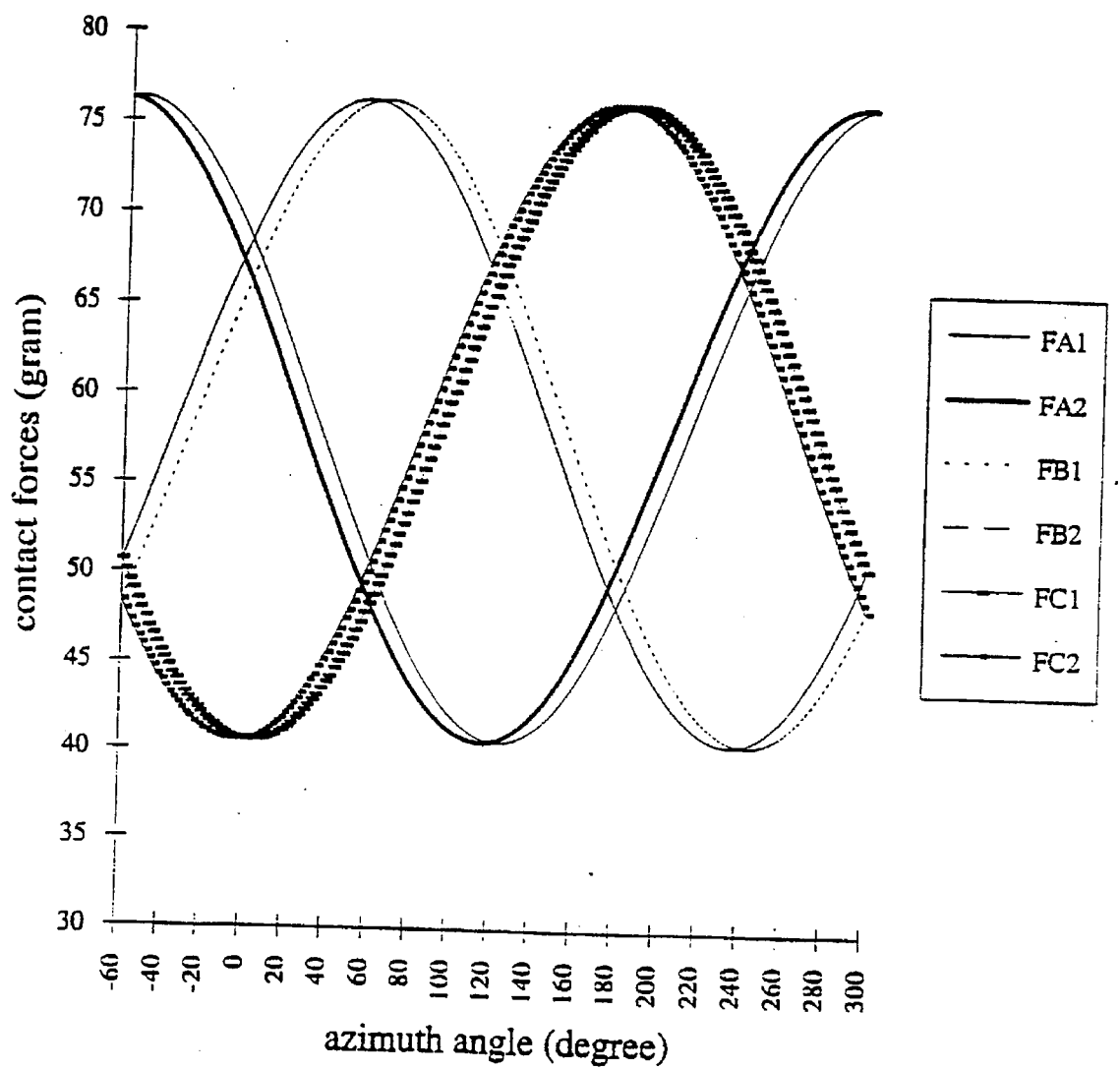
FIG. 4 illustrates contact forces with respect to azimuth angle for a vertical probe wherein $F_p$=3 grams, θ=90°, l=50 mm, R=5 mm, $F_s$=230 grams.
Figure 5:
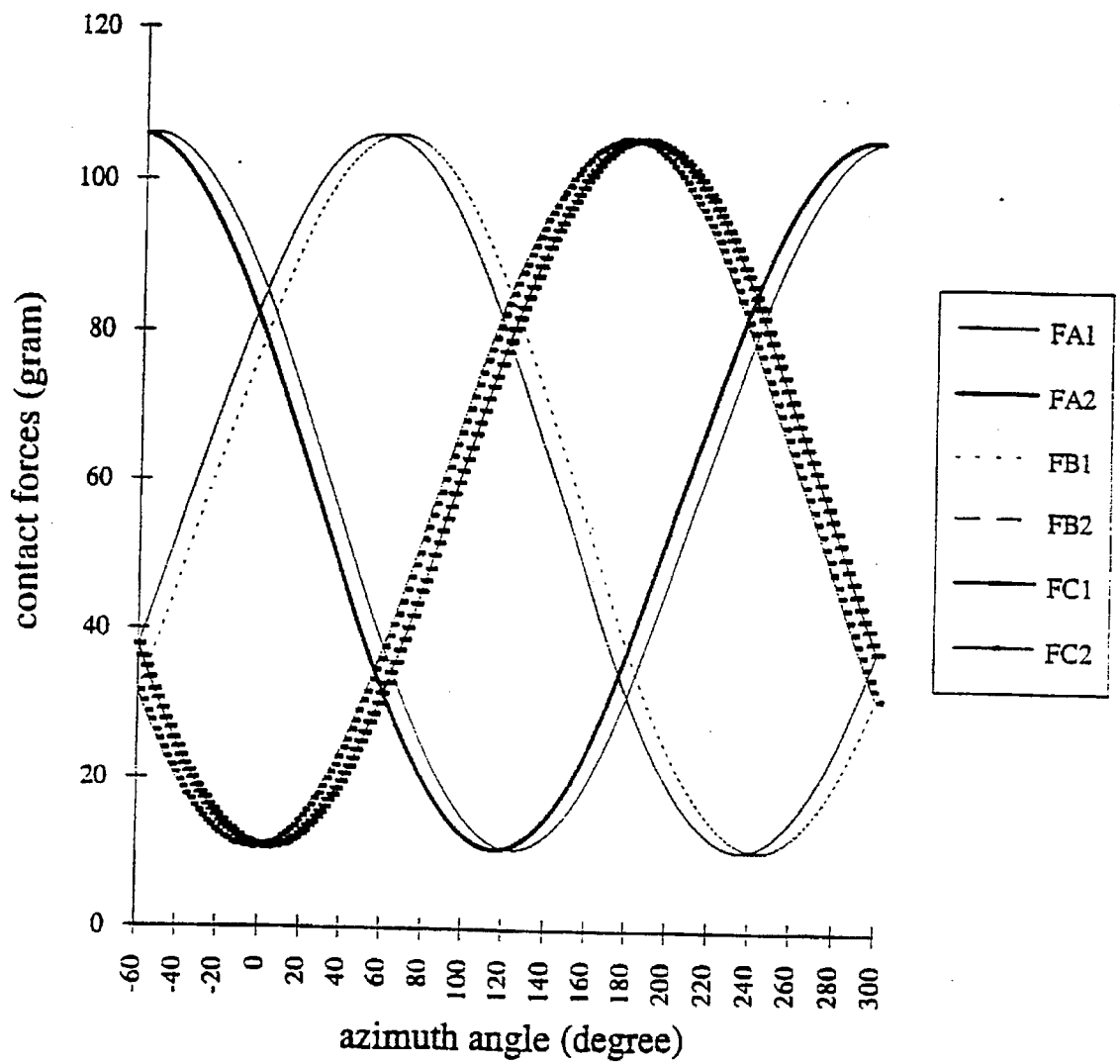
FIG. 5 illustrates contact forces with respect to azimuth angle for a vertical probe wherein $F_p=8$ grams, $\theta=90°$, $l=50$ mm, $R=5$ mm, $F_s=230$ grams.

FIGS. 4 and 5 show the relationship among the six contact forces, the probing force $F_p$, and the trigger condition, with respect to azimuthal angle ($0°<\phi<360°$) when $F_p$ is 3 gm and 8 gm at $\theta=90°$ latitude. Additional parameter values used in FIGS. 4 and 5 are as follows: l=50 mm, R=5 mm, $\alpha=41°$, and $F_s=230$ gm.

When $F_p$ increases gradually in the probe approach direction during the probing process, the six contact forces vary (increase or decrease) in magnitude while their directions remain unchanged because of the kinematic seating design. In FIGS. 4 and 5 it is observed that $F_{C1}$ is always the smallest among the six contact forces when $0°<\phi<60°$. The smallest forces in other azimuthal regions are as follows: $F_{A2}$ when $60°<\phi<120°$, $F_{A1}$ when $120°<\phi<180°$, $F_{B2}$ when $180°<\phi<240°$, $F_{B1}$ when $240°<\phi<300°$, and $F_{C2}$ when $300°<\phi<360°$. As a result, there is always one unique contact force which will reach a force threshold (a small value) in each of the six 60° azimuthal regions when $F_p$ increases gradually. In addition, two contact forces have the same magnitude at the following special azimuthal angles: $F_{C1}$ and $F_{C2}$ at $0°$, $F_{C1}$ and $F_{A2}$ at $60°$, $F_{A1}$ and $F_{A2}$ at $120°$, $F_{A1}$ and $F_{B2}$ at $180°$, $F_{B1}$ and $F_{B2}$ at $240°$, and $F_{B1}$ and $F_{C2}$ at $300°$. As shown in FIGS. 4 and 5, when $\phi=0°$, $F_{C1}$ and $F_{C2}$ are close to a threshold force level when $F_p=8$ gm. In this specific approach direction ($\phi=0°$ and $\theta=90°$) an 8-gm force would cause the two contact forces ($F_{C1}$ and $F_{C2}$) to reach a threshold force level prior to the remaining contact forces. The probe trigger condition can be expressed as follows: when one or more contact forces reach a threshold force level, $F_t$, a trigger signal is generated. By setting each of the contact forces to $F_t$ in its azimuthal region, the probing force at the trigger instant can be expressed as follows.

$$F_p = \frac{F_s + W - 6 \sin\alpha F_t}{\left( \cos\theta + 2\frac{l}{R} \sin\theta \cos\phi \right) - 2 \sin\theta \sin\phi \tan\alpha} \quad (-60° \leq \phi \leq 0°) \quad (13)$$

$$F_p = \frac{F_s + W - 6 \sin\alpha F_t}{\left( \cos\theta + 2\frac{l}{R} \sin\theta \cos\phi \right) + 2 \sin\theta \sin\phi \tan\alpha} \quad (0° \leq \phi \leq 60°) \quad (14)$$

$$F_p = \frac{6 \sin\alpha F_t - (F_s + W)}{\frac{l}{R} \sin\theta(\cos\phi - \sqrt{3} \sin\phi) - \cos\theta - \sin\theta \tan\alpha(\sin\phi + \sqrt{3} \cos\phi)} \quad (60° \leq \phi \leq 120°) \quad (15)$$

$$F_p = \frac{6 \sin\alpha F_t - (F_s + W)}{\frac{l}{R} \sin\theta(\cos\phi - \sqrt{3} \sin\phi) - \cos\theta + \sin\theta \tan\alpha(\sin\phi + \sqrt{3} \cos\phi)} \quad (120° \leq \phi \leq 180°) \quad (16)$$

$$F_p = \frac{6 \sin\alpha F_t - (F_s + W)}{\frac{l}{R} \sin\theta(\cos\phi + \sqrt{3} \sin\phi) - \cos\theta - \sin\theta \tan\alpha(\sin\phi - \sqrt{3} \cos\phi)} \quad (180° \leq \phi \leq 240°) \quad (17)$$

$$F_p = \frac{6 \sin\alpha F_t - (F_s + W)}{\frac{l}{R} \sin\theta(\cos\phi + \sqrt{3} \sin\phi) - \cos\theta + \sin\theta \tan\alpha(\sin\phi - \sqrt{3} \cos\phi)} \quad (240° \leq \phi \leq 300°) \quad (18)$$

Figure 6:
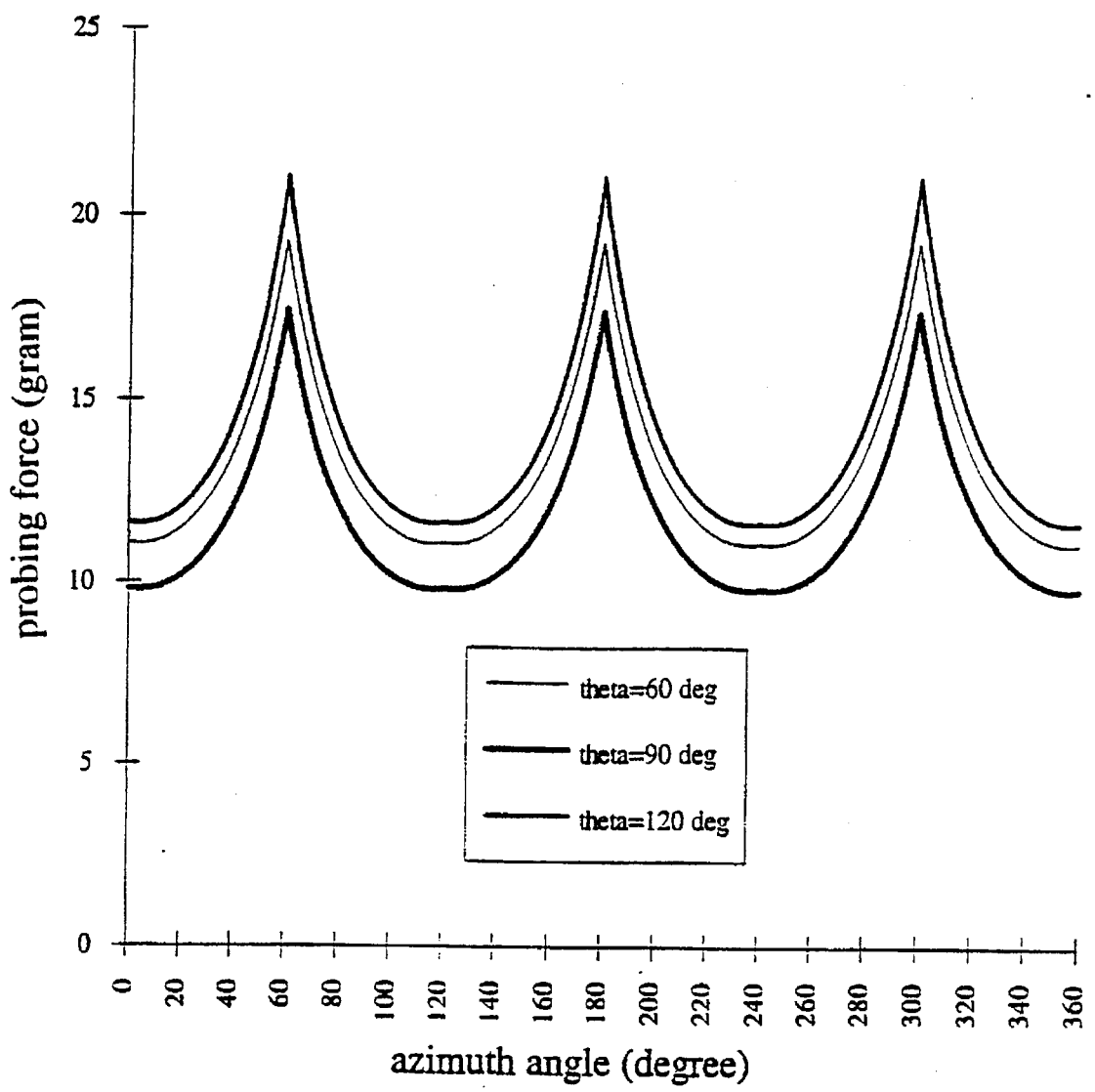
FIG. 6 illustrates a vertical probe trigger force as a function of $\phi$ when $\theta=60°$, $90°$ and $120°$ and $l=50$ mm, $R=5$ mm, $F_f=0$ grams, $F_s=230$ grams.

The above equations constitute the trigger force model for vertically-oriented touch trigger probes with straight styli. FIG. 6 illustrates trigger force curves as a function of $\phi$ when $\theta=60°$, $\theta=90°$, and $\theta=120°$ (l=50 mm, R=5 mm, $\alpha=41°$, $F_s=230$ gm, and $F_p=230$ gm).

Figure 7:
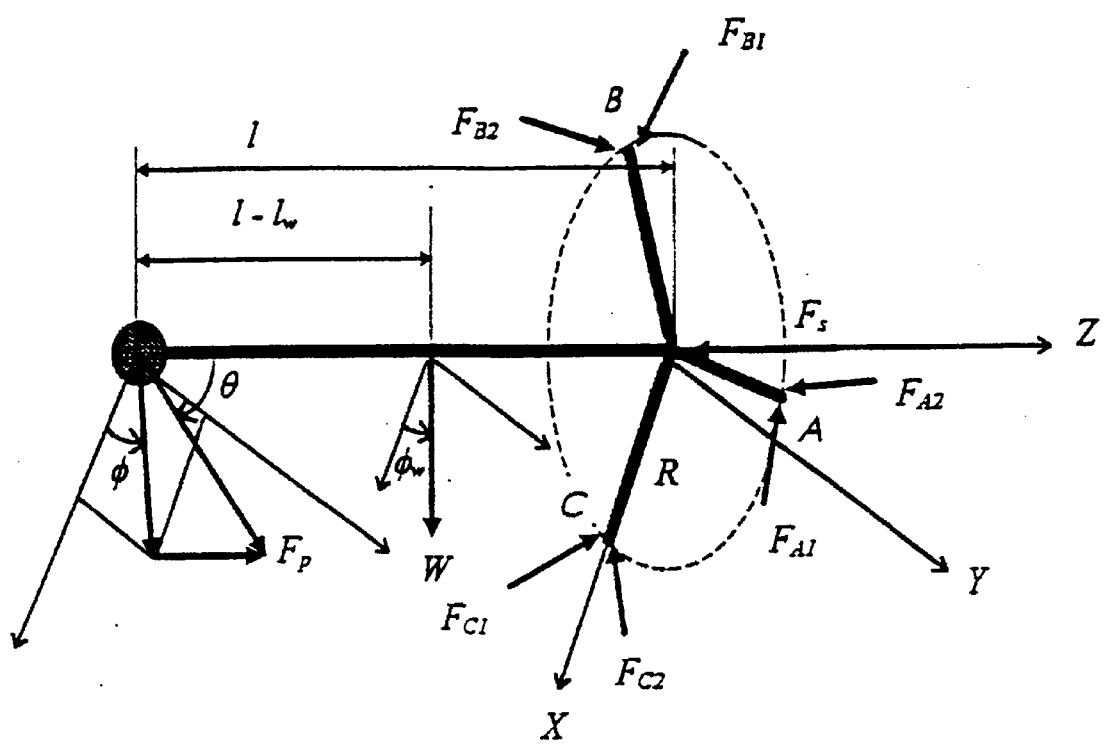
FIG. 7 is a free body diagram of a tripod-stylus structure in a horizontally-oriented probe.
Figure 8:
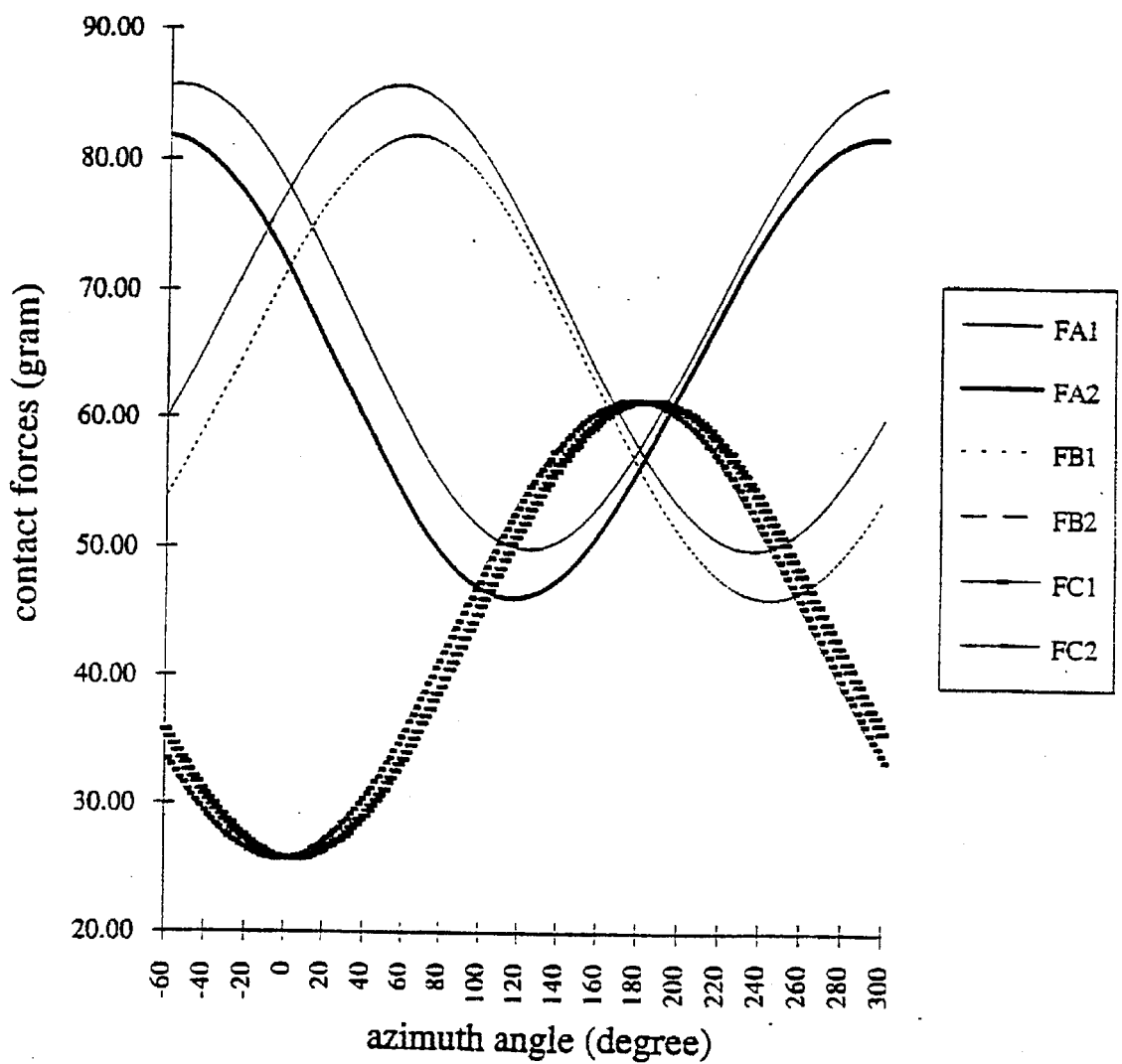
FIG. 8 illustrates contact forces with respect to azimuth angle for a horizontal probe wherein $F_p=3$ grams, $\theta=90°$, $l=50$ mm, $R=5$ mm, $F_s=230$ grams, $W=5$ grams, $\phi_w=0°$, $l_w=25$ mm.
Figure 9:
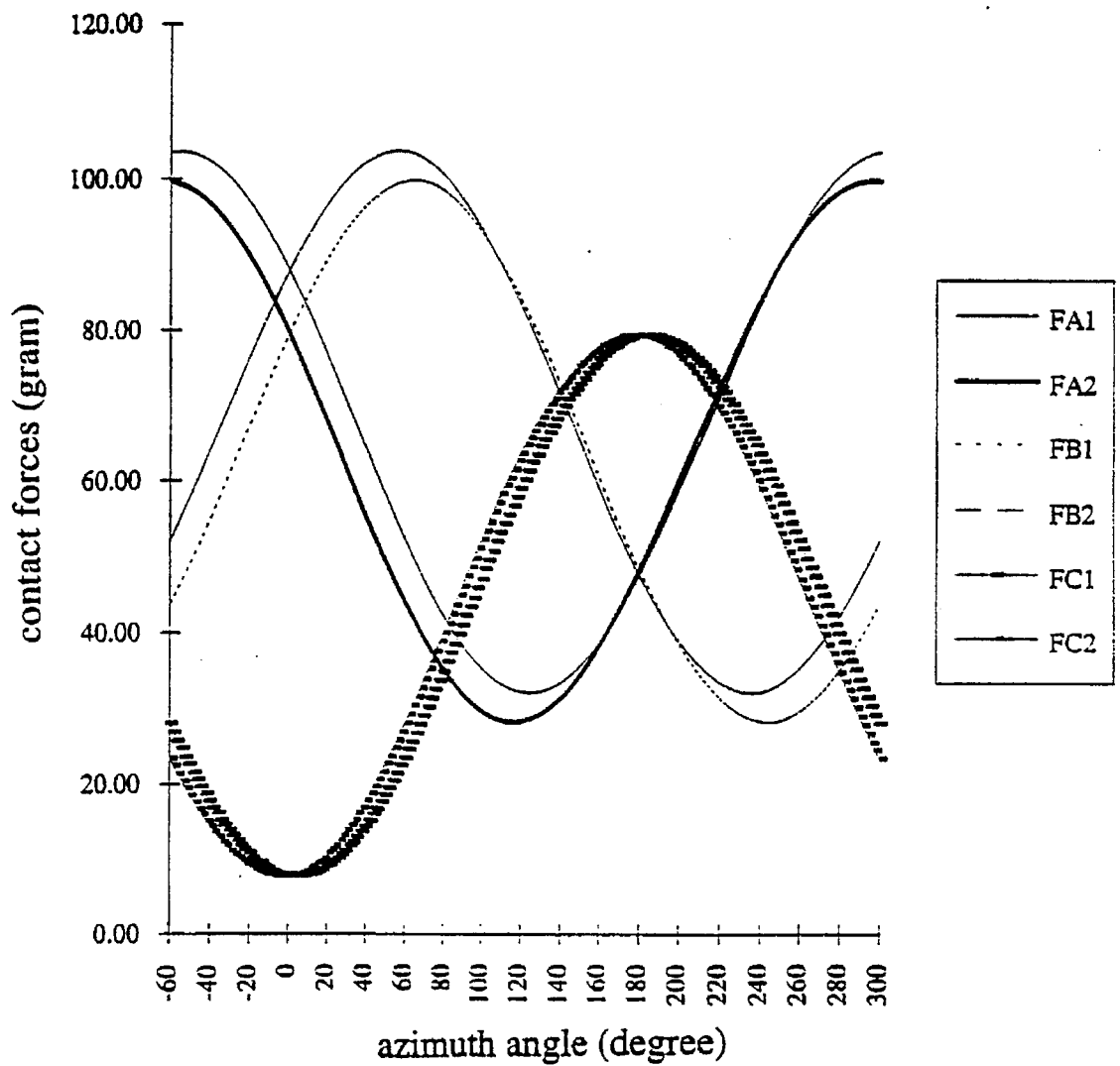
FIG. 9 illustrates contact forces with respect to azimuth angle for a horizontal probe wherein $F_p=8$ grams, $\theta=90°$, $l=50$ mm, $R=5$ mm, $F_s=230$ grams, $W=5$ grams, $\phi_w=0°$, $l_w=25$ mm.

The free body diagram of the tripod-stylus structure in a horizontally-oriented probe is shown in FIG. 7. The direction of the weight of the tripod-stylus structure is perpendicular to the stylus direction. $l_w$ defines the location of the center of gravity of the tripod-stylus structure, and $\phi_w$ defines the orientation of the weight W with respect to the tripod orientation (leg C). Using coordinate axes defined in FIG. 7, the gravity effects on the trigger condition are taken into account based on the following equations wherein F denotes force and M denotes moment:

FIGS. 8 and 9 show variation of six contact forces with respect to azimuthal angle ($0°<\phi<360°$) for a given polar angle ($\theta=90°$). By using the threshold force level concept described above, the probing force at the trigger instant can be expressed as follows:

$$\Sigma F_x = 0 \quad (-F_{A1} + F_{A2} + F_{B1} - F_{B2})\cos\alpha \cos30° + F_p \sin\theta \cos\phi + W \cos\phi_w = 0 \tag{19}$$

$$\Sigma F_y = 0 \quad (-F_{A1} + F_{A2} - F_{B1} + F_{B2})\cos\alpha \sin30° + (F_{C1} - F_{C2})\cos\alpha + F_p \sin\theta \sin\phi + W \sin\phi_w = 0 \tag{20}$$

$$\Sigma F_z = 0 \quad (F_{A1} + F_{A2} + F_{B1} + F_{B2} + F_{C1} + F_{C2})\sin\alpha + F_p \cos\theta - F_s = 0 \tag{21}$$

$$\Sigma M_x = 0 \quad (F_{A1} + F_{A2})R \sin\alpha \cos30° - (F_{B1} + F_{B2})R \sin\alpha \cos30° + F_p l \sin\theta \sin\phi + Wl_w \sin\phi_w = 0 \tag{22}$$

$$\Sigma M_y = 0 \quad (F_s - F_p \cos\theta)R \cos60° - F_p l \sin\theta \cos\phi - (F_{C1} + F_{C2})R \sin\alpha(1 + \cos60°) - Wl_w \cos\phi_w = 0 \tag{23}$$

$$\Sigma M_z = 0 \quad (F_{A1} - F_{A2} + F_{B1} - F_{B2} + F_{C1} - F_{C2})R \cos\alpha = 0 \tag{24}$$

The six contact forces can be obtained by solving the equations of equilibrium.

$$F_{A1} = \frac{F_s}{6\sin\alpha} + F_p \left[ \frac{\sin\theta}{6\sin\alpha} \; \frac{l}{R} (\cos\phi - \sqrt{3} \sin\phi) - \frac{\cos\theta}{6\sin\alpha} + \frac{\sin\theta}{6\cos\alpha} (\sin\phi + \sqrt{3} \cos\phi) \right] + \tag{25}$$
$$W \left[ \frac{l_w}{6\sin\alpha \, R} (\cos\phi_w - \sqrt{3} \sin\phi_w) + \frac{1}{6\cos\alpha} (\sin\phi_w + \sqrt{3} \cos\phi_w) \right]$$

$$F_{A2} = \frac{F_s}{6\sin\alpha} + F_p \left[ \frac{\sin\theta}{6\sin\alpha} \; \frac{l}{R} (\cos\phi - \sqrt{3} \sin\phi) - \frac{\cos\theta}{6\sin\alpha} - \frac{\sin\theta}{6\cos\alpha} (\sin\phi + \sqrt{3} \cos\phi) \right] + \tag{26}$$
$$W \left[ \frac{l_w}{6\sin\alpha \, R} (\cos\phi_w - \sqrt{3} \sin\phi_w) - \frac{1}{6\cos\alpha} (\sin\phi_w + \sqrt{3} \cos\phi_w) \right]$$

$$F_{B1} = \frac{F_s}{6\sin\alpha} + F_p \left[ \frac{\sin\theta}{6\sin\alpha} \; \frac{l}{R} (\cos\phi + \sqrt{3} \sin\phi) - \frac{\cos\theta}{6\sin\alpha} + \frac{\sin\theta}{6\cos\alpha} (\sin\phi - \sqrt{3} \cos\phi) \right] + \tag{27}$$
$$W \left[ \frac{l_w}{6\sin\alpha \, R} (\cos\phi_w + \sqrt{3} \sin\phi_w) + \frac{1}{6\cos\alpha} (\sin\phi_w - \sqrt{3} \cos\phi_w) \right]$$

$$F_{B2} = \frac{F_s}{6\sin\alpha} + F_p \left[ \frac{\sin\theta}{6\sin\alpha} \; \frac{l}{R} (\cos\phi + \sqrt{3} \sin\phi) - \frac{\cos\theta}{6\sin\alpha} - \frac{\sin\theta}{6\cos\alpha} (\sin\phi - \sqrt{3} \cos\phi) \right] + \tag{28}$$
$$W \left[ \frac{l_w}{6\sin\alpha \, R} (\cos\phi_w + \sqrt{3} \sin\phi_w) - \frac{1}{6\cos\alpha} (\sin\phi_w - \sqrt{3} \cos\phi_w) \right]$$

$$F_{C1} = \frac{F_s}{6\sin\alpha} - F_p \left[ \frac{1}{6\sin\alpha} \left( \cos\theta + 2\frac{l}{R} \sin\theta \cos\phi \right) + \frac{\sin\theta \sin\phi}{3\cos\alpha} \right] - W \left( \frac{\cos\phi_w \, l_w}{3\sin\alpha \, R} + \frac{\sin\phi_w}{3\cos\alpha} \right) \tag{29}$$

$$F_{C2} = \frac{F_s}{6\sin\alpha} - F_p \left[ \frac{1}{6\sin\alpha} \left( \cos\theta + 2\frac{l}{R} \sin\theta \cos\phi \right) - \frac{\sin\theta \sin\phi}{3\cos\alpha} \right] - W \left( \frac{\cos\phi_w \, l_w}{3\sin\alpha \, R} - \frac{\sin\phi_w}{3\cos\alpha} \right) \tag{30}$$

The contact forces at the six contact locations can be expressed as functions of $F_s$, $F_p$, l, R, $\alpha$, $\theta$, $\phi$, W, $l_w$, and $\phi_w$.

$$F_p = \frac{6F_t \sin\alpha - F_s - W\left[\frac{l_w}{R}(\cos\phi_w - \sqrt{3}\sin\phi_w) + \tan\alpha(\sin\phi_w + \sqrt{3}\cos\phi_w)\right]}{\sin\theta \frac{l}{R}(\cos\phi - \sqrt{3}\sin\phi) - \cos\theta + \tan\alpha\sin\theta(\sin\phi + \sqrt{3}\cos\phi)} \quad (F_{A1} = F_t) \tag{31}$$

$$F_p = \frac{6F_t \sin\alpha - F_s - W\left[\frac{l_w}{R}(\cos\phi_w - \sqrt{3}\sin\phi_w) - \tan\alpha(\sin\phi_w + \sqrt{3}\cos\phi_w)\right]}{\sin\theta \frac{l}{R}(\cos\phi - \sqrt{3}\sin\phi) - \cos\theta - \tan\alpha\sin\theta(\sin\phi + \sqrt{3}\cos\phi)} \quad (F_{A2} = F_t) \tag{32}$$

$$F_p = \frac{6F_t \sin\alpha - F_s - W\left[\frac{l_w}{R}(\cos\phi_w + \sqrt{3}\sin\phi_w) + \tan\alpha(\sin\phi_w - \sqrt{3}\cos\phi_w)\right]}{\sin\theta \frac{l}{R}(\cos\phi - \sqrt{3}\sin\phi) - \cos\theta + \tan\alpha\sin\theta(\sin\phi - \sqrt{3}\cos\phi)} \quad (F_{B1} = F_t) \tag{33}$$

$$F_p = \frac{6F_t \sin\alpha - F_s - W\left[\frac{l_w}{R}(\cos\phi_w + \sqrt{3}\sin\phi_w) - \tan\alpha(\sin\phi_w - \sqrt{3}\cos\phi_w)\right]}{\sin\theta \frac{l}{R}(\cos\phi + \sqrt{3}\sin\phi) - \cos\theta - \tan\alpha\sin\theta(\sin\phi - \sqrt{3}\cos\phi)} \quad (F_{B2} = F_t) \tag{34}$$

$$F_p = \frac{F_s - 6F_t\sin\alpha - W\left(2\frac{l_w}{R}\cos\phi_w + 2\tan\alpha\sin\phi_w\right)}{\left(\cos\theta + 2\frac{l}{R}\sin\theta\cos\phi\right) + 2\tan\alpha\sin\theta\sin\phi} \quad (F_{C1} = F_t) \tag{35}$$

$$F_p = \frac{F_s - 6F_t\sin\alpha - W\left(2\frac{l_w}{R}\cos\phi_w - 2\tan\alpha\sin\phi_w\right)}{\left(\cos\theta + 2\frac{l}{R}\sin\theta\cos\phi\right) - 2\tan\alpha\sin\theta\sin\phi} \quad (F_{C2} = F_t) \tag{36}$$

Figure 10:
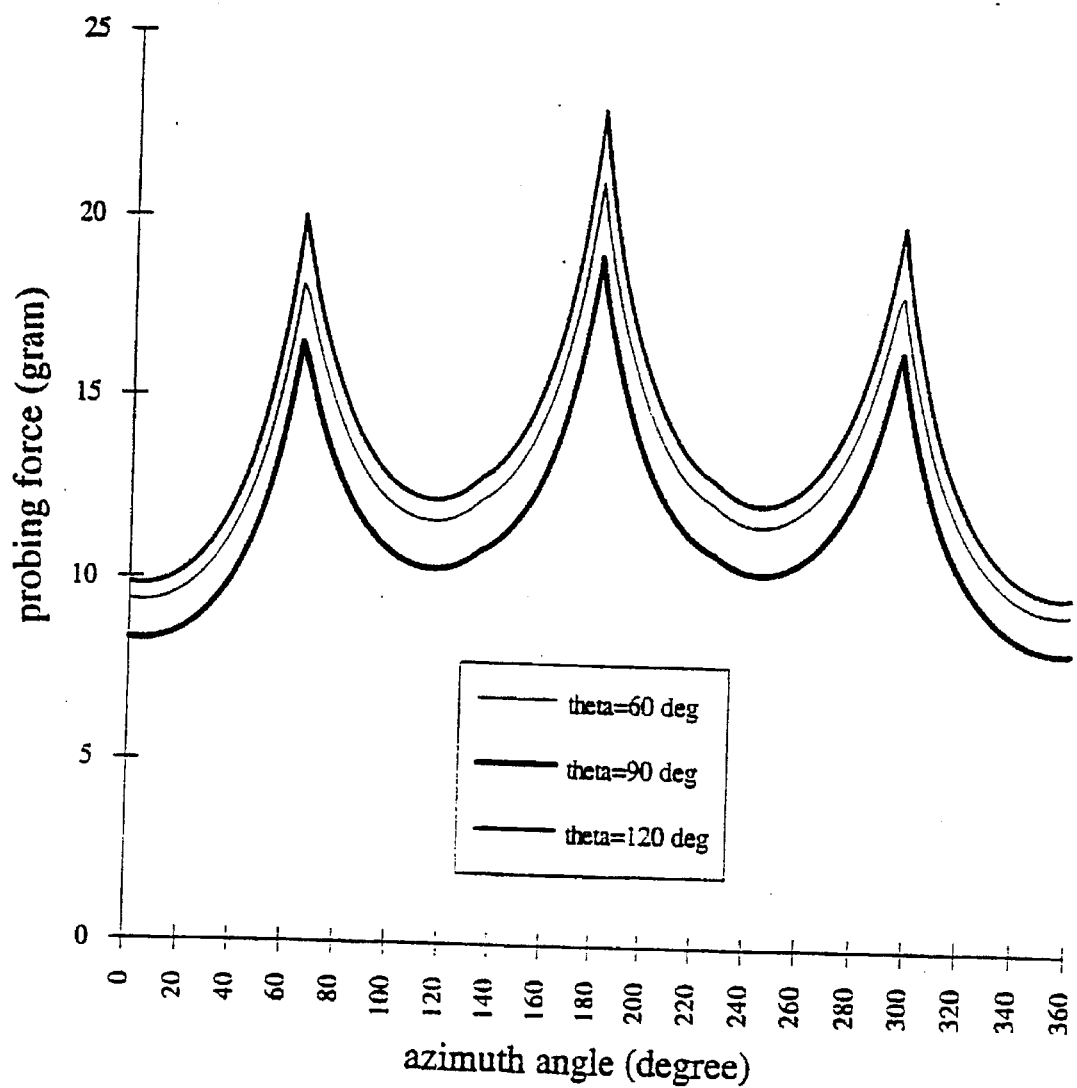
FIG. 10 illustrates horizontal probe trigger force as a function of $\phi$ where $\theta=60°$, $90°$ and $120°$ and $l=50$ mm, $R=5$ mm, $F_f=0$ grams, $F_s=230$ grams, $W=5$ grams, $\phi_w=0°$, $l_w=25$ mm.
Figure 11:
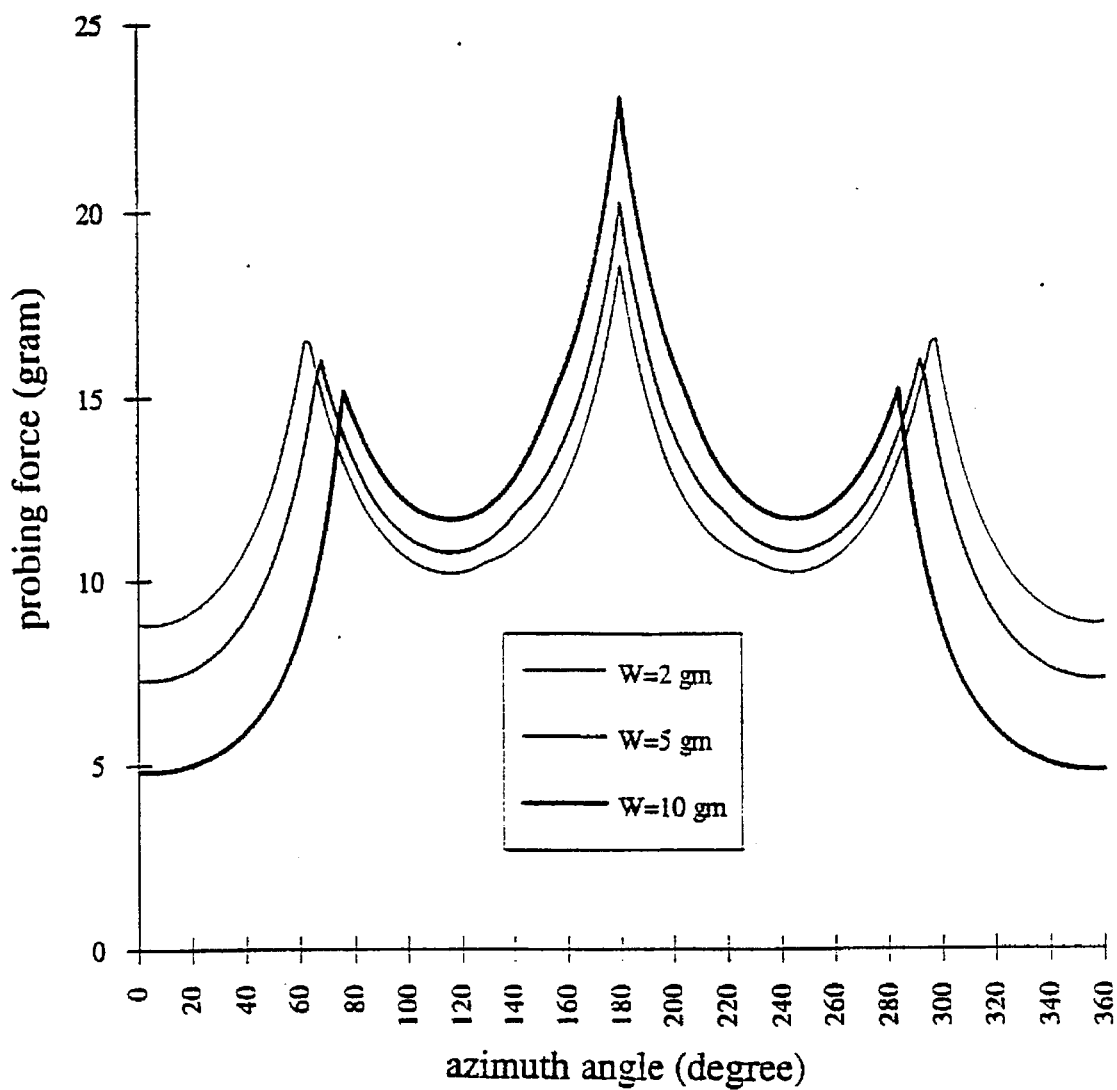
FIG. 11 illustrates horizontal probe trigger force as a function of $\phi$ when $W=2$, 5 and 10 grams and $l=50$ mm, $R=5$ mm, $F_f=0$ grams, $F_s=230$ grams, $\theta=90°$, $\phi_w=0°$, $l_w=25$ mm.
Figure 12:
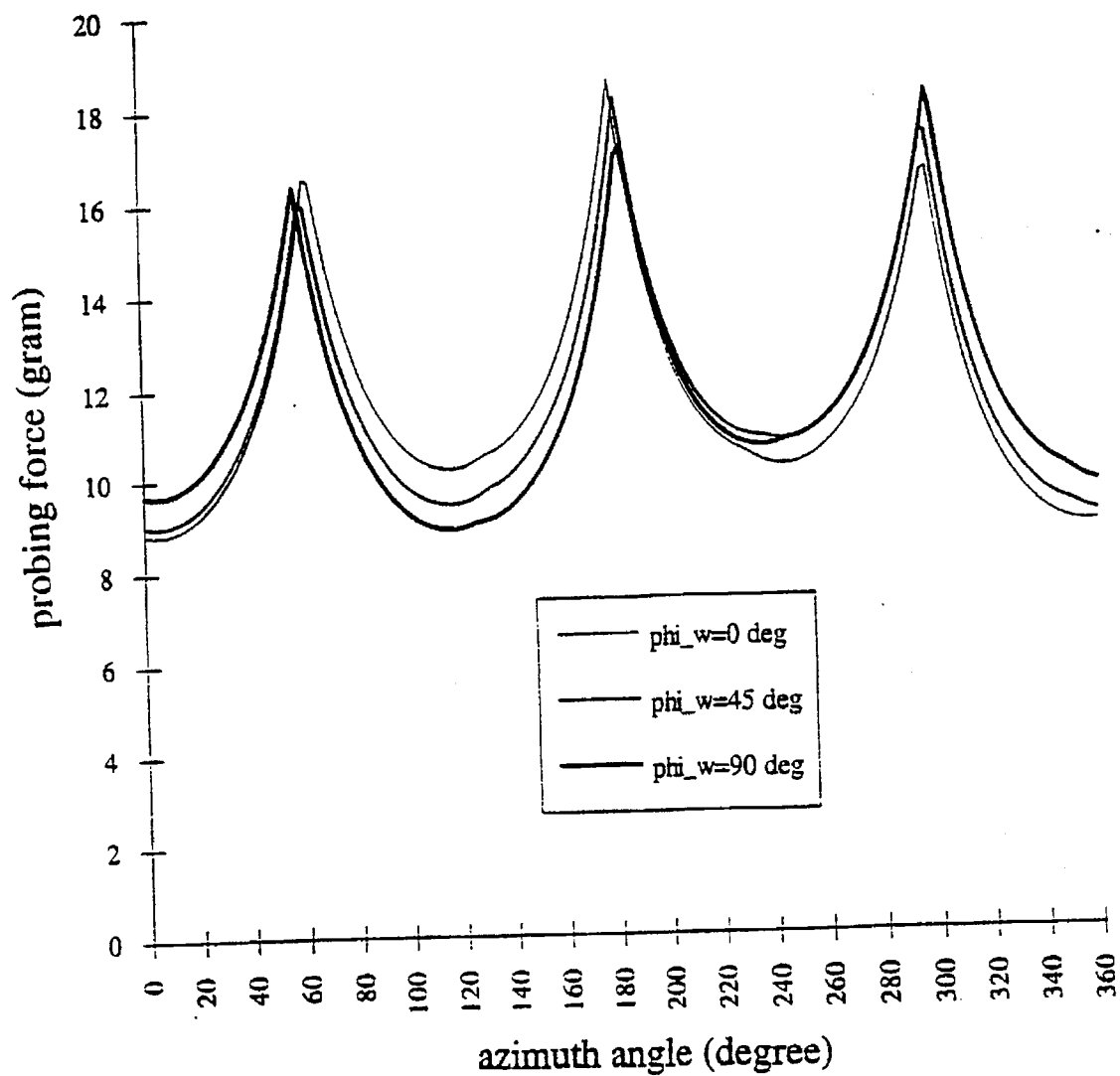
FIG. 12 illustrates horizontal probe trigger force as a function of $\phi$ where $\phi_w=0°$, $45°$ and $90°$ and $l=50$ mm, $R=5$ mm, $F_f=0$ grams, $F_s=230$ grams, $\theta=90°$, $W=2$ grams, $l_w=25$ mm.

The above equations constitute the trigger force model for horizontally-oriented touch trigger probes with straight styli. FIG. 10 illustrates trigger force curves as a function of $\phi$ when $\theta=60°$, $\theta=90°$, and $\theta=120°$. FIG. 11 shows trigger force as a function of $\phi$ when W=2 gm, W=5 gm, and W=10 gm. FIG. 12 shows trigger force curves with different $\phi_w$ angles (0°, 45°, and 90°) and W=2 gm.

A force threshold concept is used according to the invention in deriving the trigger force in probe operation. It is assumed that when one or more contact forces reach a force threshold a trigger signal is generated. For instance, the electrical resistance formed by the tripod-seat arrangement can be used to detect the trigger condition. Other ways of using the contact forces described in this invention to derive the trigger force include: (1) taking into account the sum of contact forces such that the sum of the contact forces reaching a threshold value indicates the trigger condition; (2) taking into account the sum of the inverse of each of the contact forces such that the sum of the inverse forces reaching a threshold value indicates the trigger condition; and (3) taking into account the sum of the contact areas in the tripod seating arrangement caused by the contact forces such that the sum of the contact areas reaching a threshold value indicates the trigger condition.

The trigger force is a function of probe design parameters (l, R, $\alpha$) and probe operation parameters ($\theta$, $\phi$, $F_s$, $F_t$) in vertical probes. It is shown in FIG. 6 that the derived trigger force at fixed latitudes shows the three-lobed pattern observed in practical applications. The three lobes are identical and they are 120° (azimuthal angle) apart from each other. The trigger force shows a strong dependency of azimuthal angle of the probe approach direction. In probe approach directions around 0°, 120°, and 240°, the trigger force is minimum, and these regions represent the easier directions for the probe to trigger in practical applications. The tripod leg associated with the angle ($\phi=0°$, 120°, or 240°) will be lifted in this situation. When $\phi=60°$, 180°, and 300°, the trigger force is maximum, and these directions represent the most difficult regions to trigger. For example, when the probe approach direction is $\phi=180°$, As represented in FIGS. 4 and 5 that two contact forces ($F_{A1}$ and $F_{B2}$) approach the threshold at the same time, while contact forces ($F_{B1}$ and $F_{A2}$) are also close to the threshold and contact forces ($F_{C1}$ and $F_{C2}$) increase since the probing motion places tripod leg (C) under more force at the same time the other two tripod legs (A and B) are lifted.

From equations 31 to 36, the trigger force is shown to be a function of the probe design (l, R, $l_w$, and W) and operation parameters ($\theta$, $\phi$, $F_s$, $F_t$, and $\phi_w$) in horizontally-oriented probes. The trigger force model still shows a three-lobe pattern, but the three lobes are of different amplitudes and widths (azimuthal angle range). It is due to the gravity effects of the tripod-stylus structure, which makes the three lobes nonsymmetrical. As shown in FIG. 12 the three-lobe pattern varies when the gravity direction changes with respect to the tripod orientation ($\phi_w$ equals to 0°, 45°, and 90°).

The invention provides trigger force models for touch trigger probes using sensing mechanisms such as electrical resistance-sensing mechanisms. As explained above, the principle of equilibrium and a force threshold concept are used to derive the models. The force threshold is used to indicate the trigger condition in probe operations. Thus, trigger force models for vertical and nonvertical probe orientations can be derived. The model parameters include the probe approach direction (described by polar and azimuthal angles), the spring force setting, stylus extension length, tripod leg length, the kinematic support angle, the weight and the location of the center of gravity of the tripod-stylus structure, and the orientation of the tripod-stylus weight with respect to the tripod legs.

The model according to the invention is capable of predicting the trigger force associated with any probe approach direction. The trigger force model shows three identical force shapes (three lobes) when the azimuthal angle changes from 0° to 360° at a fixed polar angle in the case of the vertical probe. The model also shows that the force magnitude increases when the polar angle deviates from 90°. Because the probe pretravel is caused by stylus bending, it is anticipated that the probe trigger force models can be used to facilitate the modeling of pretravel for touch probes on CMMs and machine tools.

The stylus bending deflection $\delta_b$ can be expressed by treating the stylus as a cantilever beam:

$$\delta_b = \frac{F_p \sin(\theta) l^3}{3EI} \qquad (37)$$

where $\delta_b$ is the deflection of stylus tip due to bending,

E is the elasticity modulus of stylus shaft material, $\theta$ is the polar angle at the contact point, l is the stylus length, I is the effective moment of inertia ($I = \pi r_{\mathit{eff}}^4/4$).

The deflection of the stylus tip due to compression or tension along the stylus direction (Z direction) can be expressed as follows.

$$\delta_c = \frac{F_p \cos(\theta) l}{EA} \qquad (38)$$

where $\delta_c$ is the deflection of stylus tip due to compression or tension,

A is the effective cross section area of the stylus shaft.

Figure 13:
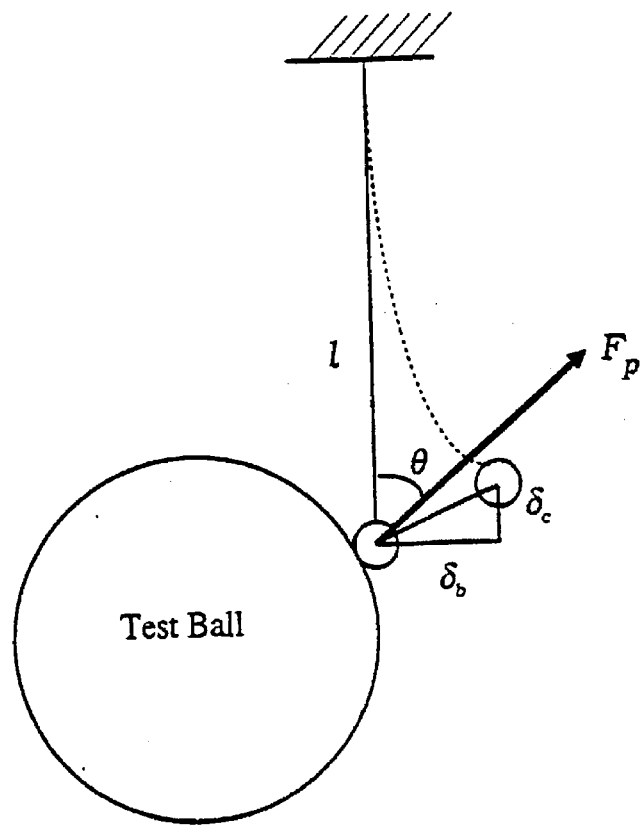
FIG. 13 illustrates probe pretravel distance $\delta$.

Because the probe usually approaches the workpiece surface by following the normal direction of the workpiece surface, the probe pretravel also follows the workpiece surface normal direction as shown in FIG. 13. As a result, the pretravel can be expressed by combining $\delta_b$ and $\delta_c$ as follows.

$$\delta_t = \delta_b \sin\theta + \delta_c \cos\theta \qquad (39)$$

Because the deflection due to compression or tension is much smaller than the bending deflection, $\delta_c$ can be neglected. Equation (39) can be simplified as:

$$\delta_t = \delta_b \sin\theta \qquad (40)$$

Equations (13–18), Equation (37) and Equation (40) constitute the pretravel model for vertical probes with straight styli.

Figure 14:
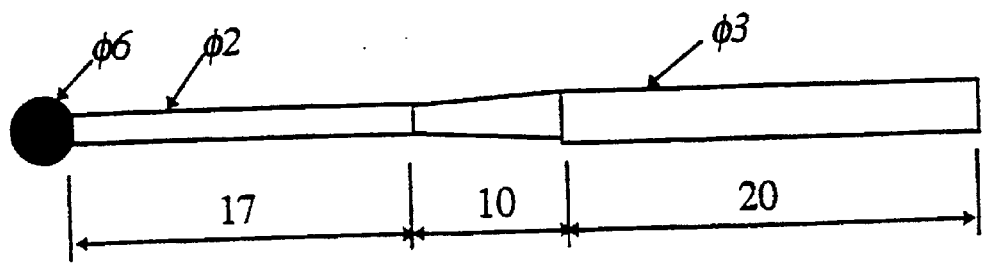
FIG. 14 illustrates dimensions of a 50 mm stylus.

The pretravel model was tested with experimental data measured in a CMM lab. Experiments were conducted on a Sheffield RL-50 CMM, and a Renishaw TP2-5 way 3D probe with a 50 mm straight stylus extension was used. The probe and stylus were oriented vertically. Dimensions of the stylus are shown in FIG. 14. Spring force ($F_s$) was measured to be 230 gm by using a digital gram gage. Other parameters of the probe are: $\alpha=41°$, R=5 mm, and l=58.5 mm (stylus extension of 50 mm and a stub of 8.5 mm). The probe tip was measured to be 6.0000±0.0002 mm in diameter and its roundness error is less than 0.0001 mm. A reference ball with nominal diameter of 10 mm was used in the experiments to collect probe data. The reference ball was calibrated to be 9.9992 mm in diameter and the roundness error is less than 0.0001 mm. In each experiment, 1561 points of probe data, which represent 1561 probe approach directions, were measured. These points were distributed in thirteen (13) latitudes of the reference ball and one point at the north pole. The polar angles of the thirteen latitudes are: 130, 120, 110, . . . , 20, and 10 deg. One hundred and twenty (120) points uniformly spaced in each latitude were measured.

Figure 15:
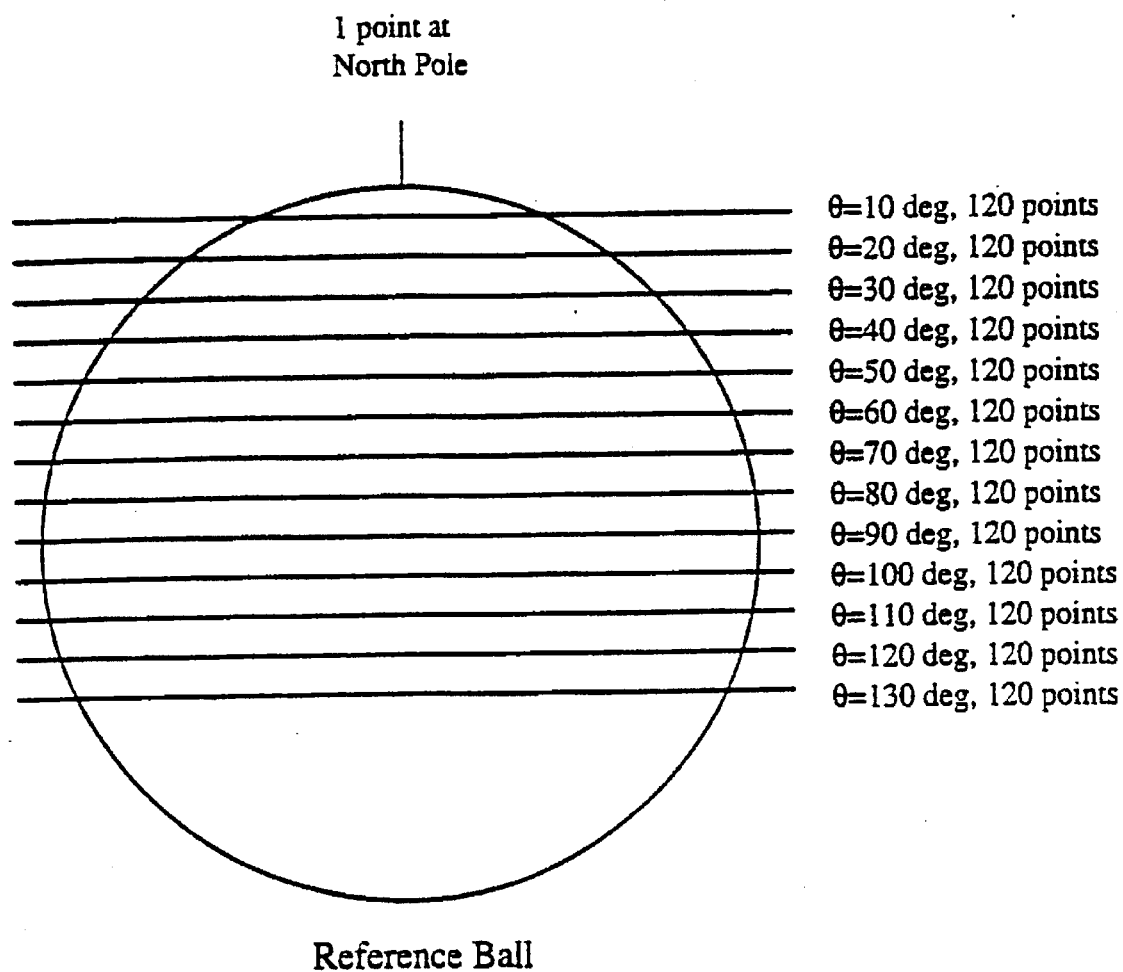
FIG. 15 illustrates a sampling plan of 1561 probe data and probe approach directions.

FIG. 15 shows the 1561 probe approach directions used in the experiments. The point index of the 1561 probe data was arranged as follows: the first 120 points (point 1 to 120) were on polar angle of 130 deg., the second 120 points (point 121 to 240) were on polar angle of 120 deg., . . . , and the last point was on the north pole (point 1561). A probe approach speed of 7.5 mm/sec was used. The experiment was repeated twenty (20) times.

The experimental pretravel data of a single run were calculated by using the measured point coordinates data at various locations on the reference ball. The center of the reference ball was first found and used to calculate the distance from each point to the center, $r_i$, i=1, 2 . . . , 1561. Pretravel was calculated by subtracting $r_i$ from the radius of the reference ball, for i=1, 2, . . . , 1561. It is important to note that the single-run pretravel data contain probe repeatability errors, and they do not represent the true probe pretravel pattern. It is also necessary to know the tripod orientation with respect to the machine coordinate system from the pretravel data in order to apply the pretravel model. A phase angle ($\phi_0$) defines this tripod orientation. Phase angle can be provided by independent measurement or by using the measured probe pretravel data. Then the least-squares method was used to best-fit the effective radius of the probe stylus between the pretravel model and the pretravel data. Because only one model parameter, r_eff, needs to be fitted, the best-fit r_eff has a closed form solution. After r_eff is found, the pretravel model can be used to predict pretravel distance associated with any appropriate probe approach directions.

Figure 16:
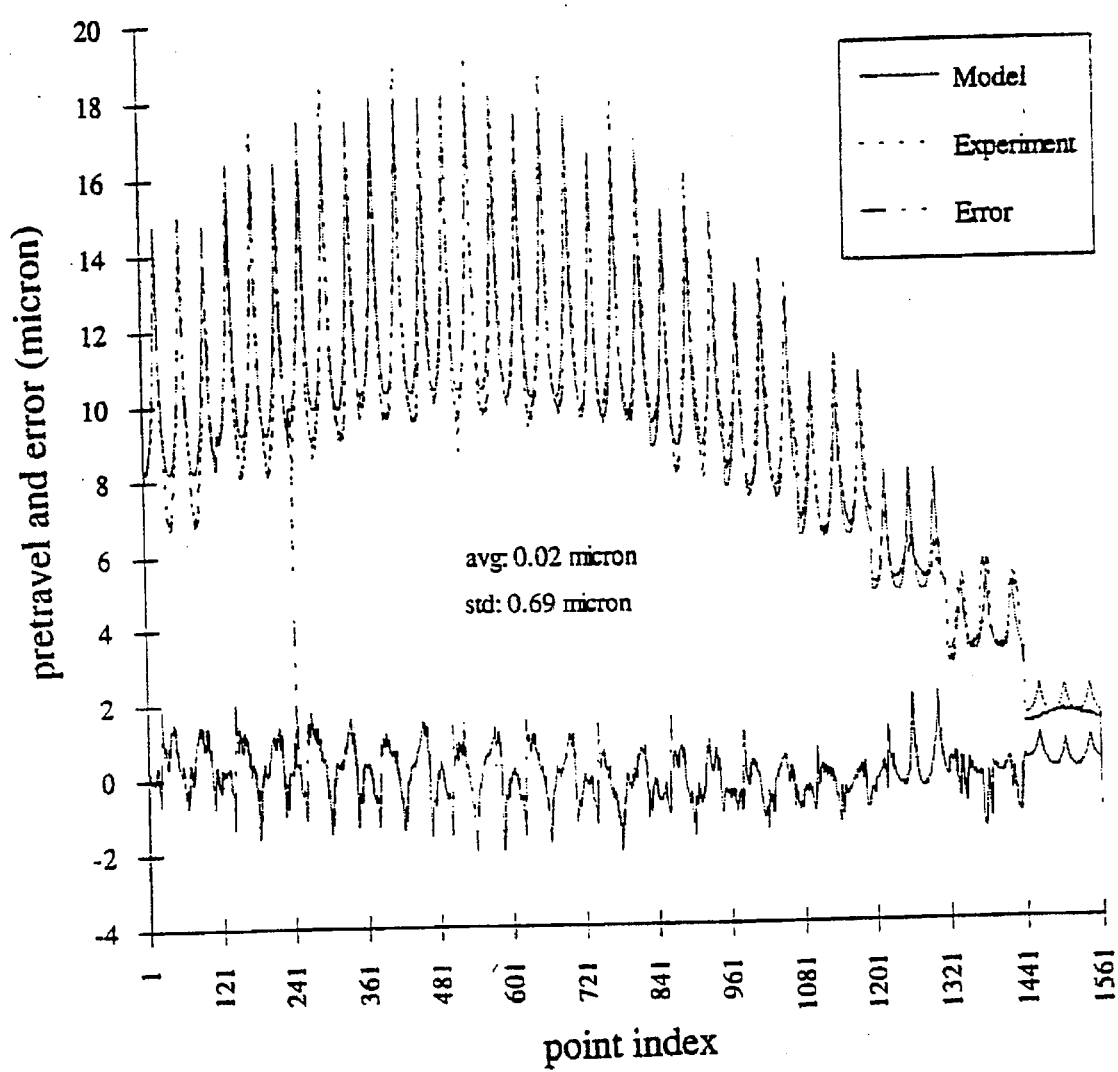
FIG. 16 illustrates pretravel prediction results using 1561 points of probe data.

Probe pretravel data were obtained averaging the single-run pretravel distances of the 20 runs. The averaging is used to separate probe pretravel from probe repeatability and machine dynamics (e.g., noise). When all 1561 points of the pretravel data were used, r_eff was found to be 1.413 min. FIG. 16 shows the results: the experimental pretravel data from the experiments were plotted against the predicted pretravel by using the pretravel model described above. Prediction errors, defined as the difference between the experimental pretravel and the model predicted pretravel, are also shown. The sum of the prediction error squares of 1561 points is 751.77 μm², and the standard deviation of there prediction errors is 0.69 μm. This is the preliminary test of the pretravel model.

The pretravel model can be further tested with a fewer number points of probe data from single-run experiments because it is desirable to use as few probe data points as possible to identify the pretravel model in commercial applications. It is also desirable to use the measurement data from the probe calibration process for this purpose because probes typically need to be calibrated when they are installed or when the machine is turned on. The pretravel model can be tested by using 24 points of probe data. From the twenty repetitions of the 1561-point probing experiments, only 24 uniformly distributed points on the equator were selected and used to find the r_eff value of the pretravel model. From each single-run of the experiments, 5 different 24 points can be selected. There were 100 24-point data sets from twenty repetitions of experiments. It is important to note that there are noise in these 24-point data sets since they were selected from single-run instead of averaged experimental data. As a result, the probe data used contained not only pretravel errors, but also other probe errors such as repeatability. Each 24-point data set was used to find reference ball center, pretravel at each point, the phase angle, and the r_eff value separately. Then the pretravel model can be used to predict pretravel errors in the 1561 probe approach directions. It can be shown that r_eff values are very stable: mean=1.408 mm, s.d.=0.006 mm. The standard deviations of the prediction errors (1561 points) of the tested 24-point data sets are all less than 0.9 μm (between 0.69 μm and 0.81 μm, mean=0.72 μm, s.d.= 0.028 μm).

It has been shown that r_eff can be identified from experimental probe data, and this is the only model parameter which needs to be identified in implementing the correction according to this invention. This model parameter (r_eff) includes the following effects: (1) trigger condition threshold (this threshold varies among machines and probes), (2) the probe approach speed (the speed effect is embedded in probe data used to identify r_eff), (3) moment of inertia of the probe stylus shaft (i.e., the probe stylus shaft usually has a complicated geometric configuration other than a constant cross-section cylinder making the moment of inertia difficult to calculate); and (4) perhaps the spring force setting (which is difficult to measure accurately).

Figure 17:
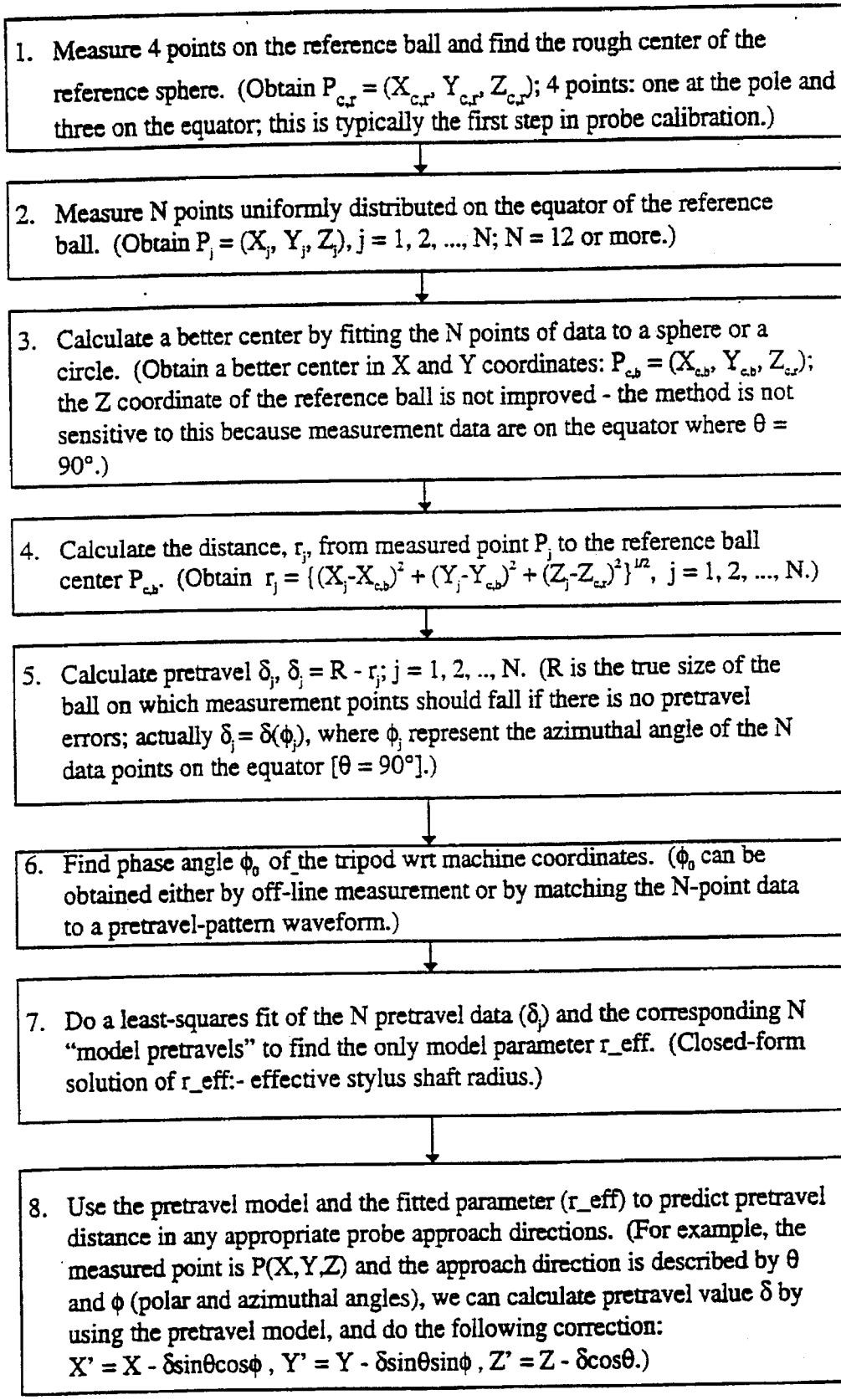
FIG. 17 is a flowchart illustrating a sequence of steps for carrying out the method according to the invention.

FIG. 17 shows a flow diagram of eight steps for carrying out a method of improving accuracy of dimensional measurements of a touch trigger probe in accordance with the invention.

In the first step, four points on a reference ball are measured (one at the pole and three on the equator), to find the rough center of a reference sphere. Thus, in the first step it is possible to obtain $P_{c,r} = (X_{c,r}, Y_{c,r}, Z_{c,r})$.

In the second step, measurements are carried out with the probe to obtain N points which can be uniformly distributed on the equator of the reference ball. Thus, in the second step it is possible to obtain $P_j = (X_j, Y_j, Z_j)$, $j=1, 2, \ldots, N$; N=24 or more points).

In the third step, a better center of the reference ball is calculated by fitting the N points of data to a sphere or circle. In this step, it is possible to obtain a better center in the X and Y coordinates: $P_{c,b} = (X_{c,b}, Y_{c,b}, Z_{c,b})$. The Z coordinate of the reference ball is not improved in this step since the measurement data are carried out on the equator where θ=90°.

In the fourth step, the distance $r_j$, from measured point $P_j$ to the reference ball center $P_{c,b}$ is calculated. Thus, in the fourth step it is possible to obtain $r_j = \{(X_j - X_{c,b})^2 + (Y_j - Y_{c,b})^2 + (Z_j - Z_{c,r})^2\}^{1/2}$, $j=1, 2, \ldots, N$.

In a fifth step, the pretravel $\delta_j$ is calculated, $\delta_j = R_0 - r_j$; $j=1, 2, \ldots, N$. In this case, $R_0$ is the true size of the ball on which the measurement points should fall if there is no pretravel error. Actually, $\delta_j = \delta(\phi_j)$, where $\phi_j$ represents the azimuthal angle of the N data points on the equator (θ=90°).

In the sixth step, the phase angle $\phi_0$ is determined on the tripod with respect to the machine coordinates. $\phi_0$ can be obtained either by indirect measurement or by matching the N-point data to a pretravel-pattern waveform.

In the seventh step, a least-squares fit of the N pretravel data ($\delta_j$) is carried out. In this seventh step, it is possible to determine model parameter r_eff which is the effective stylus shaft radius.

In the eight step, the pretravel model and the fitted parameter (r_eff) are used to predict pretravel distance in any appropriate probe approach directions. For example, the measured point P(X,Y,Z) and the approach direction is described by θ and φ (polar and azimuthal angles), and the pretravel value δ is calculated by using the pretravel model on the basis of the following correction: $X' = X - \delta \sin\theta \cos\phi$, $Y' = Y - \delta \sin\theta \cos\phi$, $Z' = Z - \delta \cos\theta$.

According to the invention, it is possible to adjust measured coordinates to compensate for pretravel of the touch trigger probe. The adjusting compensates for bending of the touch trigger probe between the step of contacting the workpiece with the touch trigger probe and the step of generating a trigger signal. The bending is calculated as a function of trigger force derived from contact forces of a kinematic seating arrangement of the touch trigger probe. The adjusting step can take into account six contact forces acting on a tripod seating arrangement of the touch trigger probe. For instance, the six contact forces can be summed in the adjusting step to derive the trigger force. Alternatively, the trigger force can be derived as a function of the sum of the inverse of each contact force. Also, contact areas (e.g., areas of contact between tripod legs and roller or ball supporting surfaces) of the tripod seating arrangement can be used to derive the trigger signal since the contact areas are a function of the contact forces. Based on the foregoing description of the invention, it will be apparent to the skilled artisan that other techniques of utilizing the contact forces for deriving the trigger force and/or trigger signal with measurement compensation in accordance with the invention.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for improving accuracy of dimensional measurements of a touch trigger probe, comprising steps of:

moving a touch trigger probe in an approach direction toward an object;

contacting a contact point on the object with a portion of the touch trigger probe as a result of the moving step;

generating a trigger signal corresponding to coordinates of the contact point as a result of the contacting step, the trigger signal being generated after the touch trigger probe travels a pretravel distance subsequent to the contacting step;

adjusting the coordinates to compensate for the pretravel, the adjusting step compensating for bending of the touch trigger probe between the contacting step and the generating step, the bending being calculated as a function of trigger force derived from contact forces of a kinematic seating arrangement of the touch trigger probe, the contact forces being derived by equilibrium equations.

2. The method of claim 1, wherein the trigger force varies as a function of the probe approach direction.

3. The method of claim 2, wherein the touch trigger probe includes a spring-loaded tripod support and a stylus having one end thereof attached to the tripod support and a probe tip at an opposite end thereof, the calculating of the trigger force being further based on at least one of stylus length, spring force acting on tripod support, tripod leg length and probe approach direction.

4. The method of claim 1, wherein the moving, contacting, generating and adjusting steps are carried out by a coordinate measuring machine or a computer numerically-controlled machine tool.

5. The method of claim 1, wherein the touch trigger probe includes a rectilinear stylus extending from a spring-loaded tripod support having three rectilinear legs joined together at one end thereof and forming angles of 120 degrees therebetween, the bending being due to deflection of the stylus, the deflection being about a minimum when the approach direction is parallel to a tripod leg having a free end extending away from the contact point and in the approach direction and at a maximum when the approach direction is equidistant between a pair of the tripod legs having free ends extending away from the contact point and in the approach direction.

6. The method of claim 1, wherein the trigger signal is generated after a time delay between when the touch trigger probe contacts the object and when a threshold resistance value is reached, the time delay being dependent on an amount of bending of the touch trigger probe and the amount of bending being dependent on the approach direction.

7. The method of claim 1, wherein the touch trigger probe includes a straight stylus.

8. The method of claim 1, wherein the touch trigger probe includes a non-straight stylus.

9. The method of claim 1, wherein the kinematic seating arrangement includes a spring-loaded tripod.

10. The method of claim 1, wherein the moving, contacting, generating and adjusting steps are performed as part of a machine setup or part dimension and tolerance measurements.

11. The method of claim 1, wherein the trigger signal is generated when a resistance value of an electrical circuit exceeds a threshold value, the coordinates being measured as measurement data by position counters or transducers, the measurement data being processed by data analysis software to provide measurement results.

12. The method of claim 1, wherein the moving step is carried out by moving the touch trigger probe at a speed less than 20 mm/sec.

13. The method of claim 1, wherein the approach direction is dependent on a polar angle and an azimuthal angle of the contact point relative to a machine coordinate system cooperating with the touch trigger probe.

14. The method of claim 1, wherein the touch trigger probe includes a non-vertically oriented stylus and the adjusting step takes into account effects of weight and center of gravity of the stylus.

15. The method of claim 1, wherein the adjusting step takes into account six contact forces acting on a tripod seating arrangement of the touch trigger probe and a probing force acting on a stylus of the touch trigger probe.

16. The method of claim 1, wherein the adjusting step corrects variations in pretravel of up to 50 microns, the adjusting step providing an accuracy of less than ±5 microns.

17. The method of claim 1, wherein the adjusting step corrects variations in pretravel of up to 20 microns, the adjusting step providing an accuracy of less than ±2 microns.

18. The method of claim 1, wherein the adjusting step takes into account six contact forces acting on a tripod seating arrangement of the touch trigger probe, the six contact forces being summed in the adjusting step to derive the trigger force.

19. The method of claim 1, wherein the adjusting step takes into account six contact forces acting on a tripod seating arrangement of the touch trigger probe, the trigger force being derived as a function of the sum of the inverse of each contact force.

20. The method of claim 1, wherein the adjusting step takes into account six contact forces acting on a tripod seating arrangement of the touch trigger probe, contact areas of the tripod seating arrangement being a function of the contact forces and the trigger force being derived as a function of the contact areas.

* * * * *